US012783531B1

(12) United States Patent
Bai et al.

(10) Patent No.: US 12,783,531 B1
(45) Date of Patent: Nov. 3, 2026

(54) TECHNIQUES FOR RANKING RELEVANT CONTENT

(71) Applicant: Amazon Technologies, Inc., Seattle, WA (US)

(72) Inventors: Zhengwei Bai, Milpitas, CA (US); Alessandro Moschitti, Playa del Rey, CA (US); Danielle Class, Ipswich, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/324,872

(22) Filed: Sep. 10, 2025

(51) Int. Cl.

| | |
|---|---|
| ***G06F 16/00*** | (2019.01) |
| ***G06F 16/2457*** | (2019.01) |
| ***G06F 16/248*** | (2019.01) |
| ***G06F 40/284*** | (2020.01) |
| ***G06F 40/30*** | (2020.01) |
| ***G06F 40/40*** | (2020.01) |

(52) U.S. Cl.
CPC ...... *G06F 16/24578* (2019.01); *G06F 16/248* (2019.01); *G06F 40/284* (2020.01); *G06F 40/30* (2020.01); *G06F 40/40* (2020.01)

(58) Field of Classification Search
CPC ................................................ G06F 16/24578
See application file for complete search history.

(56) References Cited

U.S. PATENT DOCUMENTS

2019/0392066 A1* 12/2019 Kim .................. G06F 16/24578

OTHER PUBLICATIONS

Chen, J., et al. "Bge m3-embedding: Multi-lingual, multi-functionality, multi-granularity text embeddings through self-knowledge distillation." arXiv preprint arXiv:2402.03216 (2024), 18 pages.

Chen, T., et al. "Xgboost: A scalable tree boosting system." Proceedings of the 22nd acm sigkdd international conference on knowledge discovery and data mining. 2016, 10 pages.

Devlin, J., et al. "Bert: Pre-training of deep bidirectional transformers for language understanding." Proceedings of the 2019 conference of the North American chapter of the association for computational linguistics: human language technologies, vol. 1 (long and short papers), 2019, 16 pages.

(Continued)

*Primary Examiner* — Ajith Jacob
(74) *Attorney, Agent, or Firm* — Pierce Atwood LLP

(57) ABSTRACT

Techniques for evaluating content based on heterogenous features (e.g., numerical and semantic features) are described. Content candidates (e.g., points of interest, events, entertainment, products, etc.) may be retrieved based on a potential relevance to a user input. A system may process the content candidate and the user input to extract numerical and semantic features (e.g., distance, rating, reviews, price, name, category, address, etc.) corresponding to the content candidate. The numerical features may be converted into semantic features (e.g., semantic representations of the numerical features). The semantic representations may be processed by a language model and the numerical features may be additionally processed using one or more encoders to generate semantic and numerical relevance values, respectively, for the content candidates. A learnable weighted sum may be applied to the relevance values to generate a ranking metric, which may be used to rank the content candidates.

20 Claims, 11 Drawing Sheets

(56) References Cited

OTHER PUBLICATIONS

Humeau, S., et al. "Poly-encoders: Transformer architectures and pre-training strategies for fast and accurate multi-sentence scoring." arXiv preprint arXiv: 1905.01969 (2019), 14 pages.
Karpukhin, V., et al. "Dense Passage Retrieval for Open-Domain Question Answering." EMNLP (1). 2020, 11 pages.
Lian, D., et al. "GeoMF++ scalable location recommendation via joint geographical modeling and matrix factorization." ACM Transactions on Information Systems (TOIS) 36.3 (2018): 1-29.
Lin, J., et al. Pretrained transformers for text ranking: Bert and beyond. Springer Nature, 2022.
Mei, L., et al. "Improving first-stage retrieval of point-of-interest search by pre-training models." ACM Transactions on Information Systems 42.3 (2023): 1-27.
Nogueira, R., et al. "Passage Re-ranking with BERT." arXiv preprint arXiv:1901.04085 (2019), 5 pages.
Panay, P. "Introducing Alexa+, the next generation of Alexa," Amazon.com, Feb. 26, 2025, URL: https://www.aboutamazon.com/news/devices/new-alexa-generative-artificial-intelligence, 11 pages.
Psyllidis, A., et al. "Points of Interest (POI): A commentary on the state of the art, challenges, and prospects for the future." Computational urban science 2.1 (2022): 20, 13 pages.
Sachan, DS, et al. "Questions are all you need to train a dense passage retriever." Transactions of the Association for Computational Linguistics 11 (2023): 600-616.
Thakur, N., et al. "Beir: A heterogenous benchmark for zero-shot evaluation of information retrieval models." arXiv preprint arXiv:2104.08663 (2021), 24 pages.
Ye, M., et al. "Exploiting geographical influence for collaborative point-of-interest recommendation." Proceedings of the 34th international ACM SIGIR conference on Research and development in Information Retrieval. 2011, 10 pages.

* cited by examiner

TECHNIQUES FOR RANKING RELEVANT CONTENT

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

DETAILED DESCRIPTION

Figure 1:
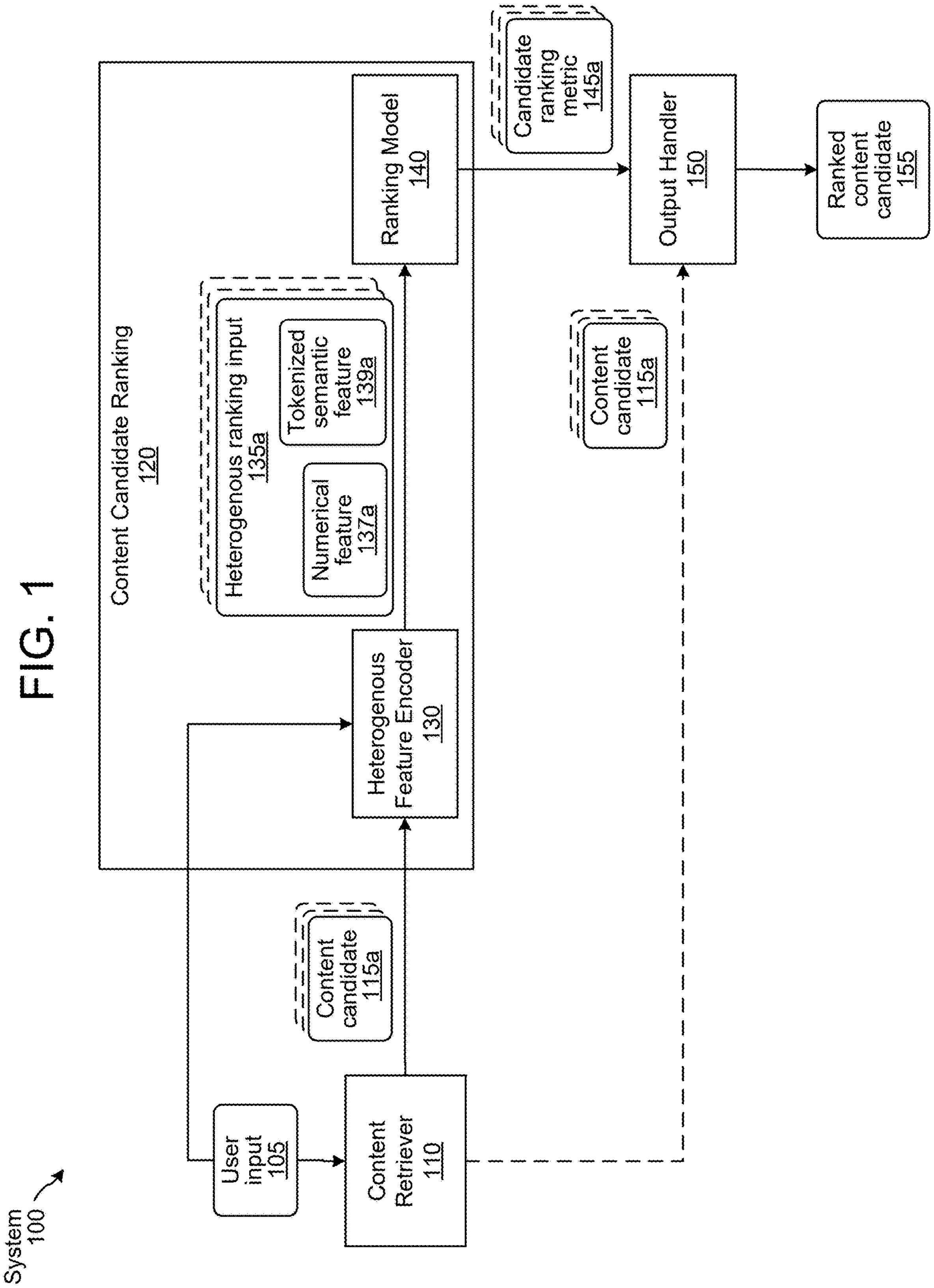
FIG. 1 is a conceptual diagram illustrating example components of a system configured to evaluate content candidates based on heterogenous features corresponding to the content candidates, according to embodiments of the present disclosure.

Natural language processing (NLP) is a field of computer science, artificial intelligence, and linguistics concerned with processing a user command input in the form of a natural human language (e.g., English, German, Chinese, etc.). Such a natural language command may come in the form of audio, text, image, or other format. Natural language processing may involve a number of different specific processing techniques such as those discussed below. Automatic speech recognition (ASR) is a field of computer science, artificial intelligence, and linguistics concerned with transforming audio data associated with speech into a textual or other token representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system, and a single component can be used to input audio and output a natural language understanding of any speech in the audio. Synthesized speech generation (SSG) (including text-to-speech (TTS)) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent speech in audio data and, using one or more models, the embedding data is processed to generate audio data and/or a system command (such as an application programming interface (API) call) responsive to the speech. Language modeling is the use of various statistical and probabilistic techniques to determine the probability of a given sequence of words occurring in a sentence. Language modeling can be used to perform various tasks including understanding a natural language input and performing generative tasks that involve generating natural language output data.

Certain systems may be configured to respond to natural language (e.g., spoken or typed) user inputs. For example, in response to the user input "find me a [cuisine type] restaurant near me," the system may output one or more restaurants serving [cuisine type] near the user. As another example, in response to the user input "recommend a highly rated [category][movie]," the system may output a movie of the requested category that is highly rated.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device. Alternatively, or in addition, the device itself may perform all or a portion of such processing.

In some instances, the system may be configured to process input text data (such as ASR data or text entered into a user interface or extracted from an image using optical character recognition) using one or more language models (e.g., one or more large language models (LLMs)) to determine a response to the user input. For example, in response to a user input of "what is the history of the United States," the language model(s) may output a synopsis of the history of the United States of America.

An artificial intelligence (AI) system may use ASR, NLU, NLG, and/or TTS, each with and/or without its own and/or a shared language model, for processing user inputs, including natural language inputs (e.g., typed, displayed, and spoken inputs) and other type of inputs (e.g., inputs not received from a user, inputs received from a system component, inputs representing occurrence of events, etc.).

The AI system may use other types of generative models including a model that processes audio/speech as an input and outputs audio/synthesized speech (a speech-to-speech model). Another example generative model that may be used is a multi-modal model that can process two or more types of data (e.g., audio, text and/or image) as inputs and/or can output two or more types of data (e.g., audio, text and/or image).

In some instances, an AI system may be configured to determine content relevant to a user input in response, or to generate a response, to the user input. For example, based on a user input requesting content (e.g., a request for recommendations, a request for specific content, etc.) the system may determine (e.g., retrieve) content that is potentially relevant (e.g., responsive) to the user input. Content may be determined and ranked based on surface-level similarities to the user input, such as the content having a lexical and/or syntactical similarity to the user input (e.g., the content include a same word, phrase, punctuation, entity, etc. as the user input), the content having an attribute type (e.g., query slot type) similar to the user input (e.g., corresponding to a same or similar attribute type as the user input), and/or the content being semantically similar to the user input. Additionally, some systems may rank content based on numerical information, such as ratings. Such numerical-only ranking can decrease accuracy in terms of determining relevant results for a user input, which can impact user experience.

The present disclosure describes, among other things, techniques for ranking (or re-ranking) content candidates based on their relevance to a user input using heterogenous (e.g., different types of) features corresponding to the content candidates. The heterogenous features may include numerical features corresponding to the content candidate (e.g., a distance, rating, review count, price, etc.) and semantic features corresponding to the content candidate (e.g., a name, category, address, etc.). The semantic features may further include semantic representations of the numerical features (e.g., semantic representations of the distance (far, near, etc.), rating (low, high, etc.), review count, price (cheap, expensive, etc.)). The numerical features corresponding to a content candidate may include numerical values representing some information related to the content (e.g., rating=5; distance=1 mile; etc.). The semantic features corresponding to a content candidate may include non-numerical (in addition to numerical) values (e.g., natural language text) representing some information related to the content (e.g., "ABC restaurant", "This is a great place for . . . ", etc.).

The system may process a user input to determine (e.g., retrieve) one or more content candidates potentially relevant (e.g., responsive) to the user input. The system may determine the content candidates using a content retriever(s), which may be configured to retrieve the content from a storage(s) of the system. For example, a semantic-based retriever component may process to retrieve content determined to be semantically similar (e.g., based on a cosine distance) to the user input from the storage(s). Additionally, or alternatively, an attribute type retriever component(s) may process to retrieve content corresponding to a particular category(ies) that may be lexically and/or syntactically similar to the user input. In some embodiments, the system may process the user input to determine an attribute type corresponding to the user input. The attribute type corresponding to the user input may include an(named) entity type (e.g., when the user requests content using an entity/POI name (e.g., "ABC store", "XYZ restaurant", [specific landmark]", etc.)), a name type (e.g., when the user requests content associated with an entity (e.g., "find me a [restaurant name] near me"), or a category type (e.g., when the user requests content using a category corresponding to content (e.g., a specific movie genre, a specific cuisine restaurant, a specific type of restaurant (e.g., fast food, bar, high-end, etc.), etc.)). Based on the attribute type, the system may cause a particular attribute type retriever component to retrieve corresponding content. In some embodiments, the determined content candidates may be represented as a (initial) ranked list of content candidates, which may be ordered based on a potential relevance of content candidates to the user input. The ordering may be based on a relevance value determined by the retriever (e.g., based on the retriever component's configuration), such as a semantic similarity metric, a lexical and/or syntactical similarity, etc.

The system may process the content candidates to extract and model heterogenous features from the content candidates. For example, the system may process the content candidates to determine semantic features (e.g., a name, category, address, etc.) and numerical features (a distance, rating, review count, price, etc.) corresponding to the content candidates. The system may determine the numerical features and the semantic features using one or more feature type extraction components. In some embodiments, a particular feature type extraction component may be configured for determining (e.g., extracting) a particular feature type from the content candidates (e.g., particular semantic or numerical features).

The system may further determine semantic features from the numerical features. The system may convert the numerical features into semantic representations corresponding to semantic features. For example, a feature type converter component may convert a numerical feature of "0.5" miles into a semantic feature of "very close". The feature type converter component may convert the numerical feature into a semantic feature based on the numerical value corresponding to the numerical feature satisfying one or more conditions (e.g., threshold values or ranges). For example, the numerical feature of "0.5 miles" may be converted into the semantic feature of "very close" based on the feature type converter component determining that the numerical feature satisfies a first condition (e.g., a threshold value of "0.0" or a range of "0.0" to "0.99") corresponding to the semantic feature of "very close". The system may include one or more feature type converters configured to convert numerical features of a particular type into corresponding semantic features.

The determined (e.g., extracted and converted) semantic features may correspond to natural language data (e.g., a name, address, category, etc.). The system may be configured to generate a tokenized representation(s) of the semantic features determined (e.g., the extracted semantic features and the converted semantic features) for the content candidate. The tokenized representation(s) may correspond to numerical representation(s) of the tokens (e.g., words, subwords, phrases, etc.) corresponding to the semantic features.

The system may process, using a ranking model, the extracted features (e.g., the numerical features and the (tokenized representation(s) of the) semantic features) and the user input to rank (or re-rank) the content candidates based on a relevance to the user input. In some embodiments, the system may process the semantic features (including the semantic representations of the numerical features) corresponding to a content candidate using a language model to generate a first value(s) (e.g., a semantic relevance value(s)) representing a semantic-based relevance of the content candidate to the user input. In some embodiments, the system may also process the numerical features corresponding to the content candidate using an encoder(s) to generate one or more second values (e.g., one or more numerical relevance values) representing a numerical-based relevance of the content candidate to the user input.

The system may use the semantic and numerical relevance values to generate a relevance metric for the corresponding content candidate. In some embodiments, a learnable weighted sum (e.g., corresponding to learned weights representing an importance of the corresponding feature(s) to the overall relevance of the content candidate to a user input) may be applied to the relevance values to generate the relevance metric.

The system may use the relevance metrics to rank (or re-rank) the content candidates according to the determined relevance to the user input. The ranked content candidates may be used to generate a response to the user input, such as using a top ranked content candidate, presenting top-k content candidates, etc.

As described herein, ranking (or otherwise evaluating) a content candidate(s) based on both semantic features and numerical features enables the system to consider different (e.g., heterogenous) relationships or connections between the user's requests (and preferences indicated therein or known to the system) and potentially relevant content candidates. For example, based on considering both semantic features (e.g., category) and numerical features (e.g., distance) corresponding to a content candidate(s) may enable to the system to rank (or evaluate) a restaurant that matches the cuisine type requested by the user, but located far away from the user, as less relevant to the user's request (e.g., "find me a sushi restaurant nearby"). Additionally, ranking (or otherwise evaluating) a content candidate(s) based on various types of both semantic features and numerical features enables the system to consider multiple types of relationships or connections between the user's requests (and preferences) and potentially relevant content candidates (e.g., in a uniform manner). For example, based on considering multiple types of semantic features (e.g., name and category) and numerical features (e.g., distance and rating) corresponding to a set of content candidates may enable the system to rank (or evaluate) a movie theatre that matches the name and movie type requested by the user and is close to the user's location, but has a poor rating, as less relevant to the user's request (e.g., find me a highly-rated [movie theatre name] movie theatre nearby that is showing horror movies").

In some embodiments, the system may process pairs of the user input and a content candidate to determine a relevance value and/or relevance metric corresponding to the content candidate. In some embodiments, the system may process such pairs at least partially in parallel. Such parallel processing may reduce latency in determining (e.g., ranking) content relevant to a user input.

Teachings of the present disclosure provide, among other things, improved computer processing for natural language processing-based systems by enabling the system to consider, in a uniform manner, heterogenous (different types of) features corresponding to content candidates when determining relevance of the content candidates to a user input. The techniques described herein can improve accuracy of the natural language processing-based system by enabling the system to use richer representations of the content candidates modeling both semantic and numerical features. Additionally, converting the numerical features into semantic representations may improve system accuracy by enabling a language model to consider both the semantic and numerical features when determining relevance of the content candidates without a decrease in accuracy due to processing numerical (feature) data. The techniques described herein may further reduce latency and improve efficiency of the natural language-based systems by enabling the system to process two or more candidates (e.g., to determine the heterogenous features and generate the relevance metric) at least partially in parallel.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models, that is they are configured to generate a sequence of data (for example representing text) based on input data, such as one more text prompts. In some embodiments, one or more of the language models may be a large language model. A Large Language Model (LLM) is a type of artificial intelligence system that is trained on vast amounts of text data to understand and generate human-like language in response to an input prompt. LLMs use deep learning algorithms, specifically neural networks, to learn patterns and relationships within the training data, enabling them to make predictions about language based on the context provided. These models can perform various natural language processing tasks, such as text generation, language translation, question answering, and sentiment analysis. An LLM analyzes an input prompt and generates an answer or response based on its training and understanding of the prompt. In some embodiments, a language model (or another type of generative model) may be further designed to process, understand, and/or generate multi-modal data including audio, text, image, and/or video.

LLMs are capable of producing coherent and contextually relevant text, making them useful tools in applications like chatbots, content creation, and virtual assistants. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model. As the name suggests, LLMs are characterized by their large size, often containing billions of parameters, which allows them to capture and learn from the intricacies and nuances of human language. Some well-known examples of LLMs include GPT (Generative Pre-trained Transformer) models, BERT (Bidirectional Encoder Representations from Transformers), and XLNet. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model.

In some embodiments, the language model(s) may be transformer-based sequence to sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and Amazon Web Services (AWS) Nova family of generative models.

In other embodiments, the language model(s) may be a decoder-only architecture. The decoder-only architecture may use left-to-right (unidirectional) encoding of the input (e.g., audio, text, image, video, etc.). Examples of such language models include the Generative Pre-trained Transformer 3 (GPT-3), GPT-4, and other versions of GPT. GPT-3 reportedly has a capacity of (approximately) 175 billion machine learning parameters. GPT-4 reportedly has a capacity of (approximately) 1.76 trillion machine learning parameters.

Other examples of generative models include Claude family of models, BigScience Large Open-science Open-access Multilingual Language Model (BLOOM), Language Model for Dialogue Applications model (LaMDA), Bard, LLaMA family of models, Gemini family of models, etc.

In some embodiments, the system may include one or more machine learning models (e.g., discriminative models) instead of or in addition to the generative model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to a generative model may be in the form of a prompt. A prompt may be a natural language input, for example, a directive or request, for the generative model to generate an output according to the prompt. The output generated by the generative model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the generative model may output a recipe (e.g., a step-by-step process represented by text, audio, image, video, etc.) to cook rice. As another example, for an example prompt "I am hungry. What restaurants in the area are open?", the generative model may output a list of restaurants near the user that are open at the time of the user prompt.

The generative models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. Few-shot learning may be implemented by including examples (exemplars) in a prompt to the model and the model may perform in-context learning. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning with regard to other data. Other learning techniques may involve performing offline/training operations for fine-tuning (e.g., using supervised fine-tuning techniques) a pre-trained generative model for a particular task.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to multiple related user inputs and system outputs (e.g., through user device(s)) between the system and the user that may have originated with a single user input initiating the dialog. Thus, the data associated with a dialog may be associated with a same dialog identifier, which may be used by components of the system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

FIG. 1 illustrates example components of a system 100 configured to evaluate content candidates based on heterogenous features corresponding to the content candidates. As illustrated in FIG. 1, the system 100 may include a content retriever component 110, a content candidate ranking component 120, and an output handler component 150. The content candidate ranking component 120 may include a heterogenous feature extraction component 130 and a ranking model 140.

As shown in FIG. 1, user input data 105 is sent to the content retriever component 110 and the heterogenous feature extraction component 130. The user input data 105 may correspond to a user request (e.g., data representing text (e.g., a text or tokenized representation of a user input), audio, image, video, button actuation, gesture, etc.) to be performed by the system 100, as described in detail herein in connection with FIG. 5. For example, the user input data 105 may include "Who was the youngest President of the United States," "What is the weather forecast for today," an indication of a button press, an input image, or the like. In some instances, the user input data 105 may be a user request for content (e.g., a POI, such as a restaurant, store, shop, landmark, location, etc.). For example, the user input data 105 may include "find me a [POI]," "recommend me a pizza place with high ratings," "what kind of clothing stores are close by," "show me [genre] movies", or the like. In some examples, the user input data 105 may include similar data as described in relation to a user input data 527 (shown in FIG. 5).

In some embodiments, the content retriever component 110 and/or the heterogenous feature extraction component 130 may also receive context data associated with the user input data 105. The context data may include user context (e.g., user location, user profile identifier, user demographics, user profile data, user preferences, etc.), device context (e.g., device type, device identifier, device location, etc.), device capabilities, device state, etc.), environmental context (e.g., time/date the user input was received/processed, device that received the user input, etc.), dialog context (e.g., prior user inputs of a dialog, prior system responses of the dialog, dialog topic, actions performed during the dialog, etc.), and the like. In some embodiments, the user input data 105 may include the context data.

The content retriever component 110 may be configured to retrieve content data potentially responsive to a user input. Example content data may include, but is not limited to, POIs (e.g., restaurants, shops, stores, landmarks, locations, etc.), events (e.g., social events, concerts, movie viewings, etc.), products, entertainment (e.g., movies, tv shows, music, audiobooks, books), etc. As shown in FIG. 1, the content retriever component 110 may process the user input data 105 to generate content candidate data 115*a-n*. The content candidate data 115*a-n* may correspond to one or more instances of content potentially responsive to the user input data 105. For example, for a user input requesting a best-rated/reviewed POI local to the user or recommended entertainment, products, events, etc., the content retriever component 110 may retrieve content corresponding to one or more POIs, one or more instances of entertainment, products, events, etc. In some embodiments, the content candidate data 115*a-n* may be represented as a list of the content candidates. As described herein in connection with FIG. 2, the content retriever component 110 may implement, or otherwise be in communication with, one or more retriever components configured to implement various techniques for retrieving the content candidate data 115*a-n*. For example, at least a portion of the content candidate data 115*a-n* may be retrieved using a retriever component configured to retrieve content based on its semantic similarity to the user input data 105. For further example, at least a portion of the content candidate data 115*a-n* may be retrieved using one or more retriever components configured to retrieve content based on its being associated with an attribute type (e.g., a name type, an entity type, a category type, etc.) of the user input data 105 and/or lexically and/or syntactically similar to the user input data 105.

The content candidate data 115*a-n* may be associated with different types of features (e.g., heterogenous features) that may be represented using different types of data. In some embodiments, some features may be represented as numbers only, such as numerical and semantic features. For example, the content candidate data 115*a-n* may be tagged with or otherwise include heterogenous features specific to the content candidates. The heterogenous features may be included in the content candidate data 115*a-n* as structured representations. As described herein, the heterogenous features corresponding to a content candidate may be extracted and used for determining a rank (e.g., representing a relevance to the user input data 105) corresponding to the content candidate data.

The content candidate data 115*a-n* may be sent to the content candidate ranking component 120. The content candidate ranking component 120 may be configured to evaluate content candidates and rank the content candidates (e.g., the content candidate data 115*a-n*) based on a user input (e.g., the user input data 105) and features extracted from the content candidate(s). The content candidate ranking component 120 may be configured to rank the content candidates based on a relevance to the user input. The content candidate ranking component 120 (e.g., the heterogenous feature extraction component 130 and the ranking model 140) may process the content candidate data 115*a-n* to generate candidate ranking metric data 145*a-n* corresponding to a metrics usable for ranking (or representing a ranking of) the content candidate data 115*a-n*. For example, the content metric data 145*a* may correspond to a metric (e.g., a value, score, natural language description of relevancy, etc.) assigned to the content candidate data 115*a* and usable for ranking the content candidate data 115*a* with respect to the other content candidate data (e.g., the content candidate data 115*b-n*), such as in a listing of the content candidate data 115*a-n*. The content candidate ranking component 120 (e.g., the heterogenous feature extraction component 130 and/or the ranking model 140) may be configured to process the content candidate data 115*a-n* at least partially in parallel.

In some embodiments, the content candidate ranking component 120 may be configured to re-rank the content candidate data 115*a-n*. For example, in some embodiments, the content candidate data 115*a-n* may be associated with a ranking metric when sent to the content candidate ranking component 120, which may indicate an initial value (e.g., probability) that the content candidate data 115*a-n* is relevant to the user input (e.g., as determined by the content retriever component 110). The value for the content candidate data 115*a-n* may represent an initial ranking of the content candidate data 115*a-n*. The content candidate ranking component 120 may be configured to generate the candidate ranking metric data 145*a-n* usable for re-ranking (or representing the re-ranking of) the content candidate data 115*a-n*.

As shown in FIG. 1, the content candidate data 115*a*-*n* may be sent to the heterogenous feature extraction component 130. The heterogenous feature extraction component 130 may be configured to determine heterogenous (different types of) features (e.g., numerical features and semantic features) corresponding to the content candidate data 115*a*-*n*. As described herein in connection with FIGS. 3A-3B, for content candidate data 115*a*, the heterogenous feature extraction component 130 may be configured to determine (e.g., extract) numerical features (e.g., distance, ratings, review count, price, etc.) from the content candidate data 115*a*. The heterogenous feature extraction component may be further configured to determine (e.g., extract) semantic features from the content candidate data 115*a*. Additionally, the heterogenous feature extraction component 130 may be configured to convert the numerical features into semantic features (e.g., a distance of "0.5" to "close", a rating of "4.5" to "excellent", etc.). For example, the heterogenous feature extraction component 130 may determine a numerical feature from the content candidate data 115*a* corresponding to a distance of "0.5 miles" and convert the numerical feature into a semantic feature of "very close".

The heterogenous feature extraction component 130 may generate heterogenous ranking input data 135*a*-*n* based on the numerical features and the semantic features corresponding to the content candidate data 115*a*-*n*. For example, heterogenous ranking input data 135*a* may correspond to or otherwise include data corresponding to the user input data 105, determined (e.g., extracted) numerical features (e.g., the numerical feature data 137*a*) and the determined (e.g., extracted) semantic features and the semantic features that correspond to the converted numerical features (e.g., tokenized semantic feature data 139*a*).

The heterogenous ranking input data 135*a*-*n* may be sent to the ranking model 140. The ranking model 140 may be configured to process data corresponding to the heterogenous features and a user input to generate a ranking metric for ranking the corresponding content candidate. As shown in FIG. 1, the ranking model 140 may process the heterogenous ranking input data 135*a*-*n* to generate the candidate ranking metric data 145*a*-*n* corresponding to the metrics indicating a relevance of the content candidate data 115*a*-*n* to the user input data 105. As described herein in connection with FIGS. 3A-3B, the ranking model 140 may include a language model configured to process the semantic features (e.g., determined (e.g., extracted) from the content candidate data 115*a*-*n* and converted from the numerical features) to generate a semantic feature metric indicating a relevance of the content candidate data 115*a*-*n* to the user input data 105 based on the semantic features. The ranking model 140 may further include one or more encoders configured to process the numerical features. In some embodiments, a particular numerical feature may be processed by a corresponding encoder configured to process the particular numerical feature. The encoder(s) may process the (corresponding) numerical features to generate numerical feature metrics indicating a relevance of the content candidate data 115*a*-*n* to the user input data 105 based on the (corresponding) numerical features. The ranking model 140 may be configured to generate a candidate ranking metric for a given content candidate based on the semantic feature metric and the numerical feature metrics generated based on the heterogenous ranking input data for the content candidate data (e.g., based on a learned, weighted sum of the semantic feature metric and the numerical feature metrics).

The candidate ranking metric data 145*a*-*n* may be sent to the output handler component 150. The output handler component 150 may be configured to rank (or re-rank) content candidate data based on content ranking metrics received from the content candidate ranking component 120. The ranking (or re-ranking) may indicate a final, determined relevance of the content candidate data (e.g., the content candidate data 115*a*-*n*) to the user input (e.g., the user input data 105). As shown in FIG. 1, the output handler component 150 processes the candidate ranking metric data 145*a*-*n* (and, optionally, the content candidate data 115*a*-*n*) to generate ranked content candidate data 155 corresponding to the ranking (or re-ranking) of the content candidate data 115*a*-*n*.

The ranked content candidate data 155 may be sent to one or more component(s) of the system 100 for further processing. For example, a top (e.g., top-n) ranked content candidate of the content candidate data 115*a*-*n* may be selected for output or generation of an output responsive to the user input data 105. For instance, a response of "here is a [product]" may be generated and/or output in response to user input data 105 including "find me a highly rated and reviewed [product]" based on content candidate data corresponding to the product and being top ranked in the ranked content candidate data 155.

Figure 2:
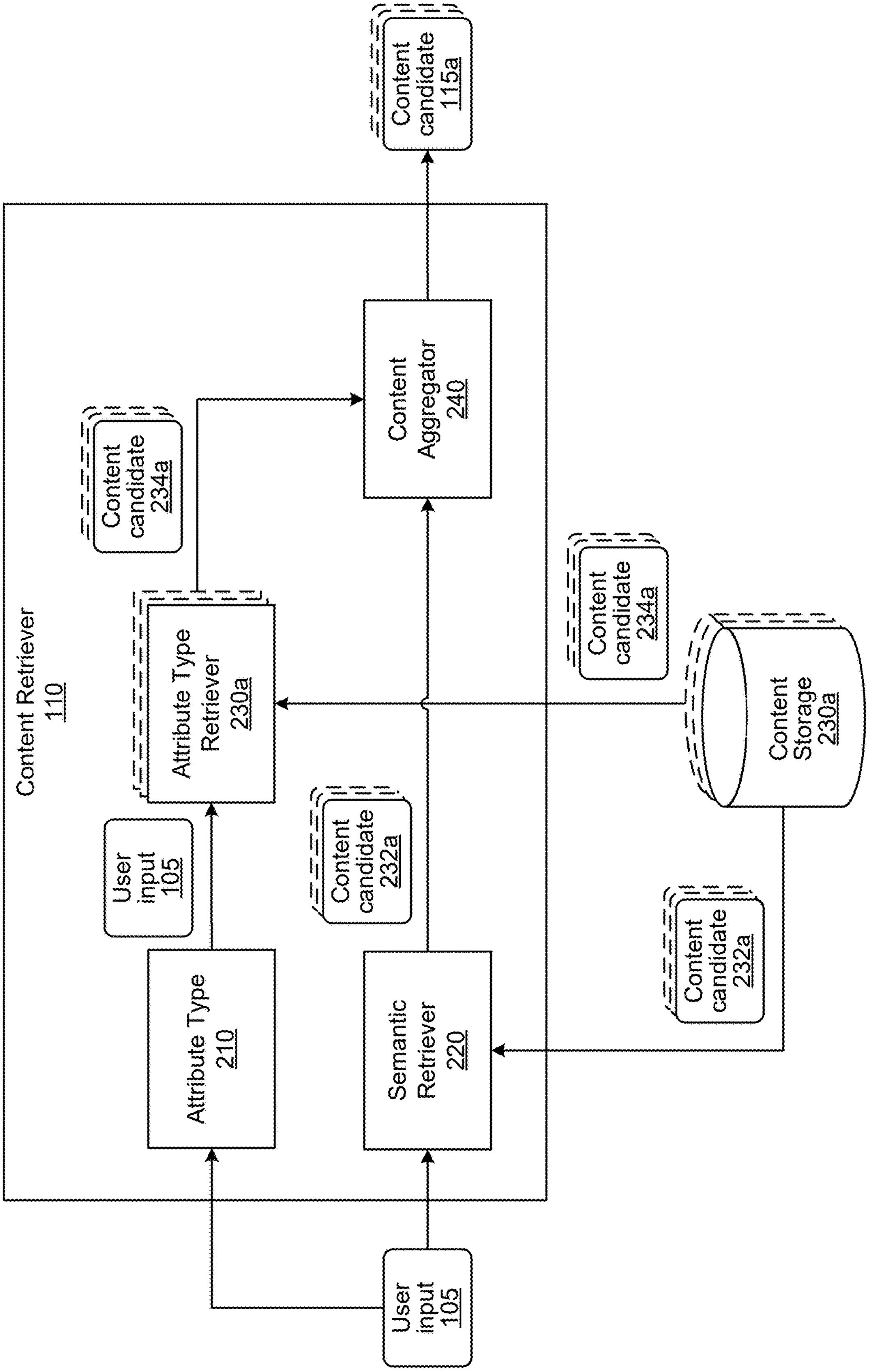
FIG. 2 is a conceptual diagram illustrating example components and processing of a content retriever component, according to embodiments of the present disclosure.

FIG. 2 illustrates example components and processing of a content retriever component 110. As illustrated in FIG. 2, the content retriever component 110 may include an attribute type component 210, a semantic retriever component 220, one or more attribute type retriever components (e.g., attribute type retriever component 230*a*-*n*), and a content aggregator component 240. As further illustrated in FIG. 2, the system 100 may further include one or more content storages (e.g., content storage 230*a*-*n*).

As shown in FIG. 2, the user input data 105 may be received at the attribute type component 210 and the semantic retriever component 220. The semantic retriever component 220 may be configured to determine (e.g., retrieve) one or more content candidates potentially relevant to a user input based on the content candidate(s) being semantically similar to the user input. In some embodiments, the semantic retriever component may correspond to, or otherwise implement, a neural network trained to determine and/or retrieve the semantically similar content candidates. As shown in FIG. 2, the semantic retriever component 220 may process the user input data 105 to retrieve content candidate data 232*a*-*n*. The content candidate data 232*a*-*n* may correspond to one or more content candidates determined to be semantically similar to the user input data 105 (e.g., based on a determined cosine similarity between the user input data 105 and the content candidate data 232*a*-*n*).

The semantic retriever component 220 may retrieve the content candidates from a content storage 230*a*-*n*. The content storage 230*a*-*n* may correspond to one or more storages including a plurality of content (e.g., POIs, events, products, entertainment, etc.). In some embodiments, a content storage of the content storage 230*a*-*n* may include a particular type of content (e.g., a type of content (e.g., POIs, products, entertainment, etc.), a type of particular content (e.g., restaurants, clothing, movies, etc.)). In some embodiments, a content storage of the content storage 230*a*-*n* may be configured for a particular type of search (e.g., a semantic search performed by the semantic retriever component 220, an entity, name, and/or category search by the attribute type retriever component 230*a*-*n*, etc.). Content candidates may be retrieved from the content storage 230*a*-*n* using a query including the user input data 105 and other configurations/parameters of a search to retrieve relevant and/or responsive content candidates. For example, the semantic retriever component 220 may be configured to query the content storage 230*a-n* for content candidates that are semantically similar to the user input data 105 to retrieve the content candidate data 232*a-n*.

In some embodiments, the semantic retriever component 220 may be configured to determine (e.g., retrieve) the content candidate data 232*a-n* using a semantic representation of the user input data 105. For example, the semantic retriever component 220 may be configured to generate an embedding representation of the user input data 105, which may represent or otherwise indicate semantic information corresponding to the user input data 105. The semantic retriever component 220 may retrieve the content candidate data 232*a-n* based on a comparison of the embedding representation of the user input data 105 and an embedding representation of the content candidate data 232*a-n*. In some embodiments, a content storage of the content storage 230*a-n* may (further) include embedding representations of the stored content. Based on a determined semantic similarity (e.g., based on a cosine distance), the content candidate data 232*a-n* may be retrieved from the content storage 230*a-n*.

The semantic retriever component 220 may send the content candidate data 232*a-n* to the content aggregator component 240.

The attribute type component 210 may be configured to determine (e.g., classify) one or more attribute types of (e.g., corresponding to) a user input. The attribute type may correspond to the type of content requested by the user input. For example, a user input requesting content based on a category may correspond to a category attribute type, a user input requesting content based on a name may correspond to a name attribute type (e.g., a request to find a store or restaurant, a request to play a movie or episode of a series or franchise, a request to play a song from a particular album from an artist, etc. based on a particular provided name), a user input requesting content based on an entity may correspond to an entity type (e.g., a (named) entity corresponding to a specific store, restaurant, movie, film, TV show, song, artist, etc.). For example, a user input including "find the [landmark]]" or "find [specific product]" may correspond to an attribute type of "entity". For further example, a user input including "find a [name of store/restaurant]" or "find [name of [an episode of] an entertainment series/franchise]" may correspond to an attribute type of "name". As another example, a user input including "find me a sushi restaurant" or "find me horror movies" may correspond to an attribute type of "category".

The attribute type component 210 may be configured to process the user input data 105 to determine the corresponding attribute type. In some embodiments, the attribute type component 210 may determine the attribute type of the user input data 105 using an ML model. For example, the ML model may correspond to a classifier (e.g., a neural network-based classifier). The ML model may be trained using positive and negative examples of various attribute types of user inputs (e.g., entity, name, category, etc. attribute types) such that the ML model is robustly configured to identify an attribute type of a user input. In some embodiments, the attribute type component 210 may implement rules-based or heuristics-based techniques for determining the attribute type of the user input data 105. For example, the attribute type component 210 may include a list of example user inputs or key terms (e.g., words, phrases, entities, etc.) known to correspond to a particular attribute type. Based on a comparison of the user input data 105 and the list of example user inputs or key terms, the attribute type component 210 may be configured to determine the attribute type of the user input data 105. In some embodiments, comparing the user input data 105 and the list of example user inputs or key terms may include determining a lexical and/or semantic similarity. In some embodiments, to determine the attribute type, the attribute type component 210 may employ other NLP techniques, including parsing, natural language understanding, parts-of-sentence tagging, etc.

Based on a determined attribute type of the user input data 105, the attribute type component 210 may send the user input data 105 to one of the attribute type retriever components 230*a-n*. For example, an attribute type retriever component of the attribute type retriever component 230*a-n* may be configured to retrieve content potentially relevant to a user input of a particular attribute type. The user input data 105 may be sent to the attribute type retriever component 230*a-n* configured for the attribute type of the user input data 105.

In some embodiments, the attribute type component 210 may determine more than attribute type corresponds to the user input data 105. For example, if the user input data 105 include "find me [landmark] and a pizza place close by", the attribute type component 210 may determine the user input data 105 corresponds to a "entity" attribute type and a "category" attribute type. In some such embodiments, the attribute type component 210 may route (portions of) the user input data 105 to an attribute type retriever component 230*a-n* configured for entity attribute types and an attribute type retriever component 230*a-n* configured for category attribute types, where the system 100 may process as described herein separately for the content retrieved by each attribute type retriever component 230*a-n*.

The attribute type retriever component 220*a-n* may be configured determine (e.g., retrieve) content (e.g., the content candidate data 234*a-n*) relevant to a particular attribute type of the user input data 105. For example, an attribute type retriever of the attribute type retriever 230*a-n* may be configured to determine (e.g., retrieve) content associated with a particular attribute type of the user input data 105. Similar to the semantic retriever component 220, the attribute type retriever component 230*a-n* may retrieve the content from the content storage 230*a-n*. As shown in FIG. 2, the attribute type retriever component 230*a-n* processes the user input data 105 and determines the content candidate data 234*a-n*. In some embodiments, the attribute type retriever component 230*a-n* may be configured to implement ElasticSearch techniques for retrieving the content candidate data. In some embodiments, the configuration of a query generated and used by an attribute type retriever component to retrieve the content candidate data 234*a-n* may be based on the attribute type that the attribute type retriever component is configured for. In some embodiments, the content storage 230*a-n* may include one or more storages from which one or more of the attribute type retriever components 230*a-n* may be configured to retrieve content candidate data from.

The content candidate data 234*a-n* may be sent to the content aggregator component 240. The content aggregator component 240 may be configured to aggregate content determined (e.g., retrieved) by the semantic retriever component 220 and/or the attribute type content retriever component 230*a-n* to generate a list of (distinct) content. As shown in FIG. 2, the content aggregator component 240 may receive and the process the content candidate data 232*a-n* and the content candidate data 234*a-n* to generate the content candidate data 115*a-n*. In some embodiments, the content aggregator component 240 may merge duplicate (or overlapping) content candidate data from the two retriever components. The content candidate data 115*a-n* may correspond to a combination (e.g., a union) of the content candidate data 232*a-n* and the content candidate data 234*a-n*.

In some embodiments, the semantic retriever component 220 and the attribute type retriever component 230*a-n* may be configured to retrieve content candidate data from the same content storage 230*a-n*, but may do so by implementing different techniques, as described herein. In other embodiments, the semantic retriever component 220 and the attribute type retriever component 230*a-n* may be configured to retrieve content candidate data from different content storages of the content storage 230*a-n*.

Figure 3A:
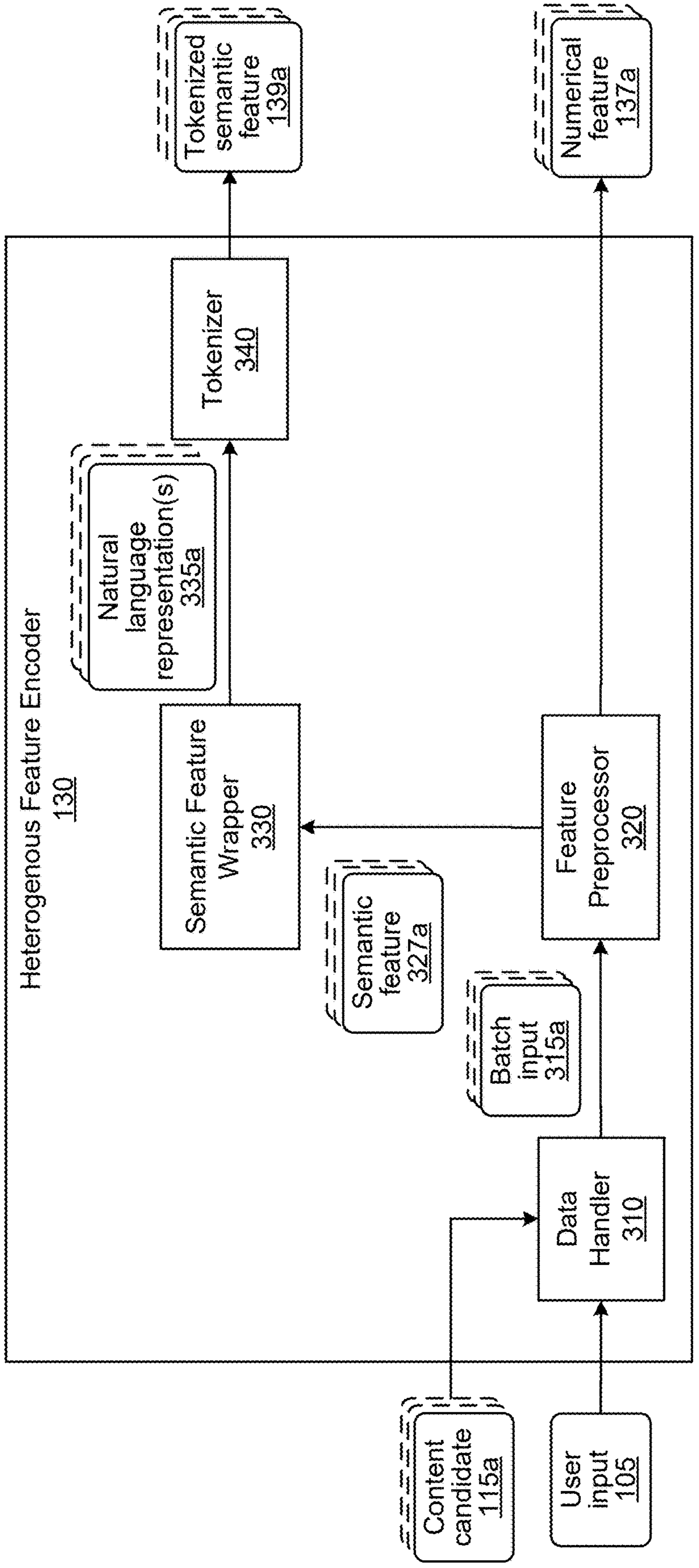
FIG. 3A is a conceptual diagram illustrating example components and processing of a heterogenous feature extraction component, according to embodiments of the present disclosure.

FIG. 3A illustrates example components and processing of a heterogenous feature extraction component 130. As illustrated in FIG. 3A, the heterogenous feature extraction component 130 may include a data handler component 310, a feature preprocessor component 320, a semantic feature wrapper component 330, and a tokenizer component 340.

As shown in FIG. 3A, the content candidate data 115*a-n* and the user input data 105 may be sent to the data handler component 310. The data handler component 310 may be configured to separate the content candidate data 115*a-n* into batches for further processing (e.g., by the feature preprocessor). As shown in FIG. 3A, the data handler component 310 may process the content candidate data 115*a-n* and the user input data 105 to generate batch input data 315*a-n* corresponding to one or more batch inputs. A batch input of the batch input data 315*a-n* may include, or otherwise correspond to, (pairs of) the user input data 105 and an instance of content candidate data from the content candidate data 115*a-n*.

The batch input data 115*a-n* may be sent to the feature preprocessor component 320. The feature preprocessor component 320 may be configured to determine (e.g., generate) heterogenous (different types of) features corresponding to input content candidate data. For example, the feature preprocessor component 320 may be configured to determine numerical features and semantic features corresponding to the content of the batch input data 315*a-n*.

As shown in FIG. 3A, the feature preprocessor component 320 processes the batch input data 315*a-n* to generate semantic feature data 327*a-n* and numerical feature data 325*a-n*. The numerical feature data 325*a-n* may correspond to one or more numerical features (e.g., number-based information) determined (e.g., extracted) from the batch input data 315*a-n*. Example numerical features may include, but are not limited to, a distance, review, rating, years since inception, first release/open date, etc. The semantic feature data 327*a-n* may correspond to one or more semantic features (e.g., natural language-based information; meaning based information) determined (e.g., extracted) from the batch input data 315*a-n*. Example semantic features may include, but are not limited to, a name, an address, a category, reviews, a brand, owners/proprietors or associated businesses, etc. Further details on the feature preprocessor component 320 are described in relation to FIG. 3B.

Figure 3B:
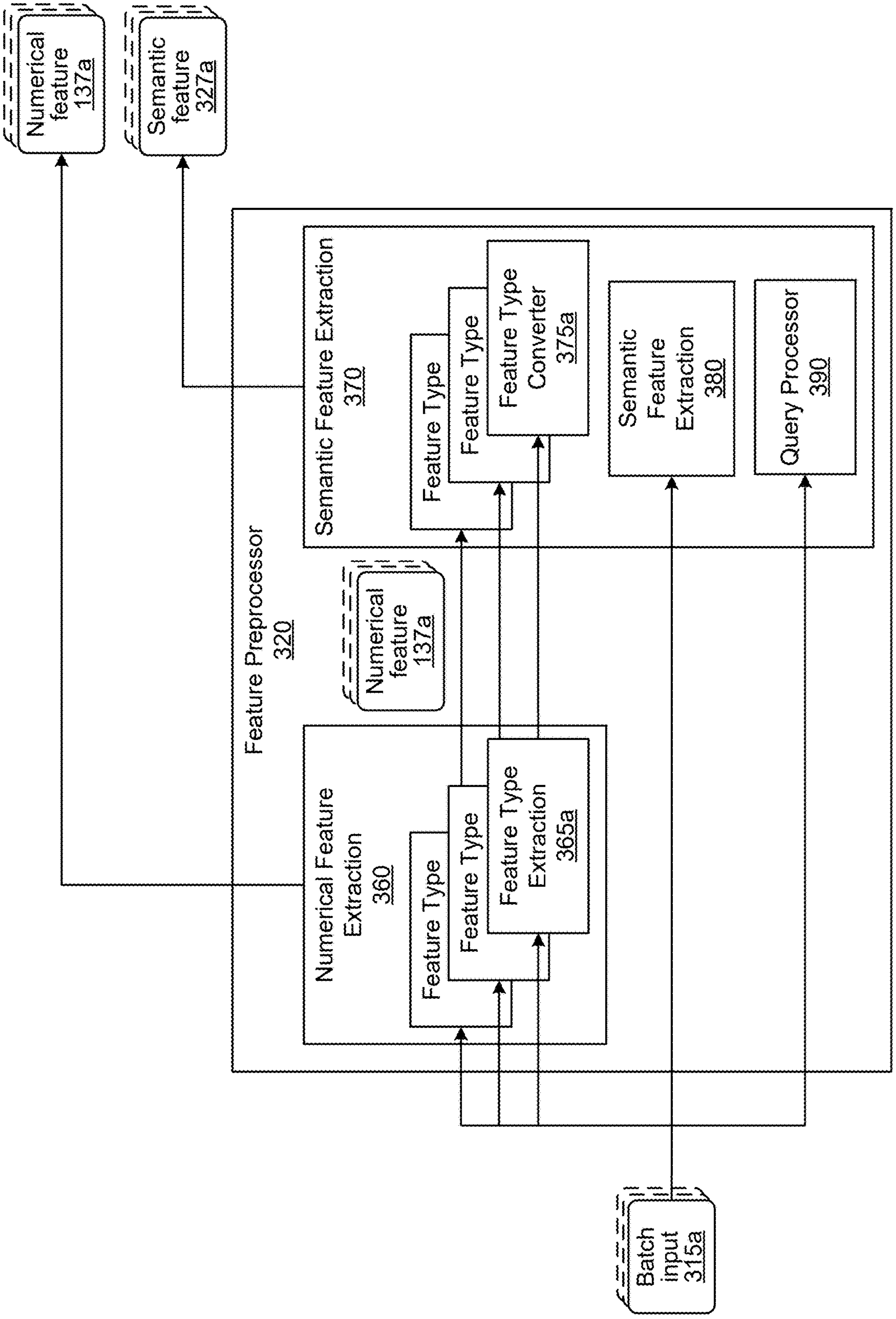
FIG. 3B is a conceptual diagram illustrating example components and processing of a feature preprocessor component, according to embodiments of the present disclosure.

As described herein in connection with FIG. 3B, the semantic feature data 327*a-n* may further include semantic features generated (e.g., converted) from one or more of the numerical features of the numerical feature data 325*a-n*. For example, the feature preprocessor component 320 may be configured to convert the numerical features into semantic features. For instance, numerical features associated with a distance of "0.5 miles" and a rating of "5.0" may be converted into numerical features of "very close" and "excellent", respectively, or the like.

The numerical feature data 325*a-n* may be output by the heterogenous feature extraction component 130. In some embodiments, as described herein, the numerical feature data 325*a-n* may be sent to another component configured to generate a representation of the numerical feature(s) and semantic feature(s) of the content candidate data 115*a-n* (e.g., the heterogenous ranking input data 135*a-n*). The semantic feature data 327*a-n* may be sent to a semantic feature wrapper component 330.

The semantic feature wrapper component 330 may be configured to add additional natural language to the semantic features for input to the ranking model 140. As shown in FIG. 3A, the semantic feature wrapper component 330 may process the semantic feature data 327*a-n* to generate natural language representation(s) data 335*a-n*. The natural language representation(s) data 335*a-n* may include natural language data corresponding to the semantic feature data 325*a-n* and additional natural language data. For example, for a semantic feature of "[content name]" corresponding to a name corresponding to the content, the contextualized semantic feature data may include "Name: [content name]", "The name is [content name]", or the like. For further example, for a semantic feature of "close" corresponding to a distance corresponding to the content, the contextualized semantic feature data may include "distance: close", "The distance is [content name]", or the like.

The natural language representation(s) data 335*a-n* may be sent to the tokenizer component 340. The tokenizer component 340 may be configured to generate a machine-understandable (e.g., tokenized) representation of the contextualized semantic feature data 335*a-n*. As shown in FIG. 3A, the tokenizer component 340 processes the natural language representation(s) data 335*a-n* to generate tokenized semantic feature data 345*a-n*. The tokenized semantic feature data 345*a-n* may correspond to numerical representations of tokens (e.g., representing words, subwords, characters, etc.) of the natural language representation(s) data 335*a-n*.

The tokenized semantic feature data 139*a-n* may be output by the heterogenous feature extraction component 130. In some embodiments, the tokenized semantic feature data 345*a-n* may be sent to another component configured to generate a representation of the numerical and semantic features of the content candidate data 115*a-n*. For example, the other system component may be configured to process the numerical feature data 137*a-n* and the tokenized semantic feature data 139*a-n* to generate a representation of the determined features of the batch input data 315*a-n* for processing by the ranking model 140. For instance, the component may process the tokenized semantic feature data 345*a-n* and the numerical feature data 325*a-n* to generate the heterogenous ranking input data 135*a-n* (shown in FIG. 1).

In some embodiments, the processing described herein may be performed for each batch input of the batch input data 315*a-n*. In some embodiments, the processing of at least two or more of the batch inputs (e.g., pairs of the user input data 105 and the content candidate data 115*a-n*) may be performed at least partially in parallel.

FIG. 3B illustrates example component and processing of a feature preprocessor component 320. As illustrated in FIG. 3B, the feature preprocessor component 320 may include a numerical feature extraction component 360 and a semantic feature extraction component 370. The numerical feature extraction component 360 may include one or more feature type extractions (e.g., feature type extraction component

365*a-n*). The semantic feature extraction component 370 may include one or more feature type converters (e.g., feature type converter component 375*a-n*), a semantic feature extraction component 380, and a query processor component 390.

As shown in FIG. 3B, the batch input data 315*a-n* may be sent to the feature type extraction component 365*a-n* of the numerical feature extraction component 360 and the semantic feature extraction component 380 and the query processor component 390 of the semantic feature extraction component 370.

The numerical feature extraction component 360 may be configured to facilitate the determination (e.g., extraction) of numerical features from the content candidate data 115*a-n* (e.g., as included in the batch input data 315*a-n*) using the feature type extraction component 365*a-n*. The feature type extraction component 365*a-n* may include one or more feature type extraction component. A feature type extraction component 365*a* may be configured to determine (e.g., extract) a particular type of numerical feature (e.g., number-based data) from the content candidate data 115*a-n*. For example, the feature type extraction component 365*a-n* may include a feature type extraction component(s) configured to determine a type(s) of numerical feature including, but not limited to, a distance corresponding to the content (e.g., to a POI), a rating corresponding to the content (e.g., a POI, event, entertainment content, a product, etc.), a number of reviews corresponding to the content, a number of years of business or since an establishment corresponding to the content, a price corresponding to the content, etc.

The feature type extraction component 365*a-n* may be configured to process the batch input data 315*a-n* to determine (a particular type of) numerical features associated with the corresponding content candidate data 115*a-n*. For example, the feature type extraction component 365*a-n* may process the batch input data 315*a-n* to determine a distance feature of "0.5" or a review score of "4.9", etc. In some embodiments, the feature type extraction component 365*a-n* may be configured to identify a tag, key term, or value (e.g., measurement (e.g., miles, kilometer, currency, etc.), or other indication of a (particular type of) numerical feature corresponding to the content candidate data 115*a-n*. In some embodiments, the feature type extraction component 365*a-n* may determine a numerical feature based on the content candidate data 115*a-n* and the user input data 105. For example, for a distance feature, the feature type extraction component 365*a-n* may be configured to determine the distance feature based on a location corresponding to the content candidate data and a location corresponding to the user input data 105 (e.g., a location of a user or device that provided the user input data 105). In some embodiments, the batch input data 315*a-n* may include the distance from the location corresponding to the user input data 105 to the location corresponding to the content candidate data.

As shown in FIG. 3B, based on processing the batch input data 315*a-n*, the feature type extraction component 365*a-n* may generate the numerical feature data 325*a-n* corresponding to the determined (e.g., extracted) one or more numerical features. The numerical features data 325*a-n* may be output by the numerical feature extraction component 360 (e.g., to the ranking model 140). In some embodiments, the numerical feature data 325*a-n* may be sent to a component configured to generate one or more vectors corresponding to one or more of the numerical features, which may be sent to the ranking model 140. The vector(s) may be configured to represent the one or more numerical features in a manner identifiable by the ranking model 140 (e.g., so that particular numerical features may be processed by corresponding components of the ranking model 140, as described herein below). The numerical feature data 325*a-n* may also be sent to the semantic feature extraction component 370.

In some embodiments, one or more of the numerical feature data 325*a-n* may correspond to a pre-generated feature. For example, the numerical feature extraction component 360 may be configured to determine whether the feature type extraction component 365*a-n* was unable to extract a corresponding numerical feature or whether the value of the extracted numerical feature was erroneous or otherwise associated with an error (e.g., a value of 0, null, error, etc.). Based on determining the feature type extraction component 365*a-n* was unable to extract a corresponding numerical feature or whether the value of the extracted numerical feature was erroneous or otherwise associated with an error, the numerical feature extraction component 360 may be configured to generate numerical feature data, or replace the erroneous value, with a pre-generated value. For example, if the feature type extraction component 365*a-n* was unable to extract a distance numerical feature or the extracted value was erroneous, the numerical feature extraction component 360 may generate numerical feature data for the distance numerical feature as a pre-generated value of "very far", or the like. In some embodiments, in response to such a determination, the system 100 may cease processing with respect to the corresponding content candidate.

The semantic feature extraction component 370 may be configured to determine (e.g., extract) one or more semantic features from an input (e.g., the batch input data 315*a-n*). The semantic feature extraction component 370 may be further configured to convert numerical features to semantic features. The semantic feature extraction component 370 may determine a semantic representation(s) (e.g., meaning-based representation) corresponding to the numerical feature data 137*a-n* using the feature type converter component 375*a-n*. The feature type converter component 375*a-n* may be configured to generate a semantic representation of the numerical features. For example, for a numerical feature of "25 miles", the feature type converter component 375*a-n* may convert the numerical feature to a semantic representation corresponding to "very far", whereas a numerical feature of "1 mile" may be converted into a semantic representation corresponding to "close". The feature type converter components 375*a-n* may convert the numerical features into semantic features using one or more thresholds or ranges. Based on whether a numerical feature (e.g., 0.5 miles) meets or exceeds one or more thresholds, or falls within one or more ranges, the numerical feature may be converted into a corresponding semantic feature. For example, a first numerical feature of "0.5" miles may be converted to a semantic feature of "very close" based on the first numerical feature meeting a first threshold value of "0 miles" or falling into a range of "0-0.99 miles" that corresponds to the semantic feature of "very close", whereas a second numerical feature of "1.0" miles may be converted to a semantic feature of "close" based on the second numerical feature meeting a second threshold value of "1.0 miles" or falling into a range of "1-4 miles" that corresponds to the semantic feature of "close"

In some embodiments, the feature type converter component 375*a-n* may include one or more feature type converter components. A feature type converter component of the feature type converter component 375*a-n* may be configured to convert a particular type of numerical feature to a corresponding semantic representation. In some embodiments, the feature type extraction component 365*a-n* may be configured to send the numerical feature data 325a-n to a corresponding feature type converter component 375a-n configured for a same type of feature (e.g., a distance, a rating, a number of reviews, a number of years of business or since an establishment corresponding to the content, a price corresponding to the content, etc.

As shown in FIG. 3B, the batch input data 315a-n may be sent to the semantic feature extraction component 380. The semantic feature extraction component 380 may be configured to extract semantic features from the retrieved content. Semantic features may correspond to categorical and/or textual information of the content. For example, the semantic feature extraction component 380 may process the batch input data 315a-n to generate semantic feature data (e.g., at least a portion of the semantic feature data 327a-n) corresponding to a name corresponding to the content candidate data 115a-n (as including in the batch input data 315a-n), a category corresponding to the content candidate data 115a-n (e.g., POI (or a specific POI category such as restaurant, store, landmark, etc.), product (or a specific product category such as clothing, toys, furniture, etc.), entertainment (or a specific entertainment category such as movie, TV show, book, music, etc.), etc.), an address corresponding to the content candidate data 115a-n, etc. The semantic feature extraction component 380 may implement various techniques to determine the semantic features. For example, the semantic feature extraction component 380 may implement an ML model (e.g., an LLM, a neural network, etc.) configured (e.g., trained) to parse content candidate data and determine (e.g., extract) corresponding semantic features. For further example, the semantic feature extraction component 380 may implement one or more NLP techniques to determine the semantic features, such as parsing, parts of sentence tagging, entity tagging, etc.

In some embodiments, the semantic feature extraction component 380 may include one or more semantic feature extraction components. For example, similar to the feature type extraction component 365a-n, a semantic feature extraction component may be configured to determine (e.g., extract) a particular semantic feature from the batch input data 315a-n.

As shown in FIG. 3B, the batch input data 315a-n may be sent to the query processor component 390. The query processor component 390 may process the user input data 105 included in the batch input. The query processor component 390 may be further configured to determine whether the user input data 105 is erroneous. For example, the query processor component 390 may be configured to verify whether performing further processing with respect to the user input data 105 will result in an error, such as an inability to generate a response to the user input data 105, generation of a response that is inaccurate or otherwise erroneous, and/or generation of a response that conflicts with a policy of the system 100. In some embodiments, the query processor component 390 may determine whether further processing with respect to the user input data 105 will result in an error using data stored by the query processor and/or another component of the system 100. For example, the query processor component 390 may utilize a list of known, erroneous inputs or terms or tokens included in inputs known to be erroneous, or filtering rules representing types of user inputs to filter out to determine whether the user input data 105 is erroneous. If the query processor component 390 determines that the user input data 105 is erroneous, processing with respect to the user input data 105 may cease. Otherwise, the user input data 105 may be included in the semantic feature data 327a-n, and the system 100 may process as described herein.

As shown in FIG. 3B, the numerical feature data 325a-n and the semantic feature data 327a-n may be output by the feature preprocessor component 320 for further processing, as described herein.

Figure 4:
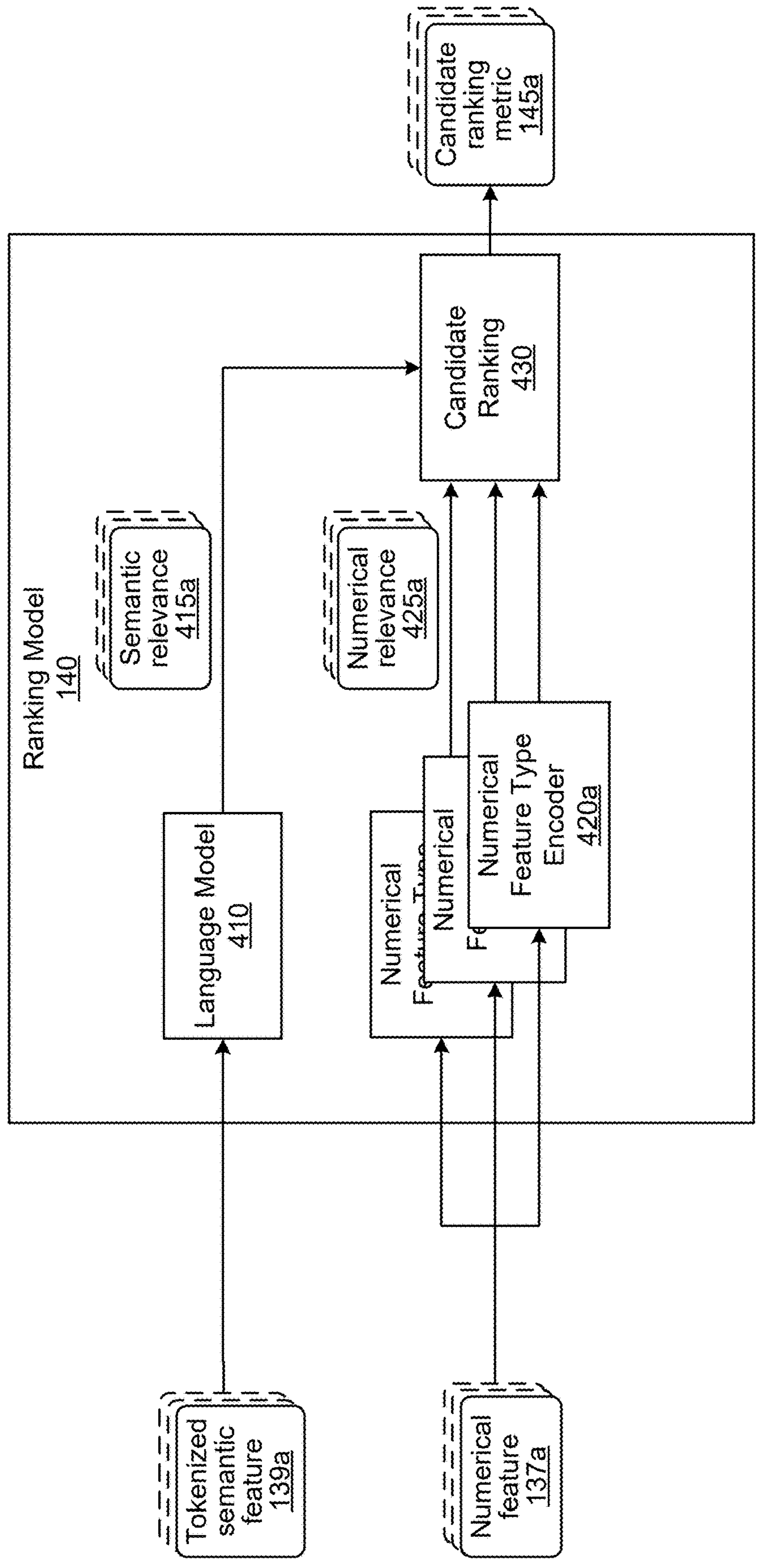
FIG. 4 is a conceptual diagram illustrating example components and processing of a ranking model, according to embodiments of the present disclosure.

FIG. 4 illustrates example component and processing of a ranking model 140. As illustrated in FIG. 4, the ranking model 140 may include a language model 410, one or more numerical feature type encoders (e.g., feature type encoder 420a-n), and a candidate ranking component 430.

As shown in FIG. 4, the tokenized semantic feature data 139a-n may be sent to the language model 410. The language model 410 may be configured to determine a semantic relevance (e.g., correlation) between a user input and a particular content candidate. In some embodiments, the language model 410 may correspond to a cross-encoder language model (e.g., a LLM, or other transformer-based model). The language model 410 may generate a value (e.g., a score) representing the semantic relevance (e.g., similarity) between (semantic features corresponding to) the content candidate and the user input. For example, for a user input including "find me a highly rated [restaurant/store] in [location] near me", the language model 410 may generate a value (e.g., a semantic relevance value) indicating first content is semantically relevant to the user input based on the semantic features corresponding to the second content (e.g., a category, an address, semantic representations of a distance and ratings, etc.) indicate that the first content corresponds to a [restaurant/store] in [location] that is "close" and has an "excellent" or "high" rating. In contrast, the language model 410 may generate a value (e.g., a semantic relevance value) indicating second content is not (or less) semantically relevant to the user input based on the semantic features corresponding to the second content (e.g., a name, a category, an address, etc.) indicating that, although the first content has "high" ratings, the first content corresponds to a [restaurant/store] that is called "[location]" and/or is "very far". As shown in FIG. 4, the language model 410 processes the tokenized semantic feature data 139a-n to generate semantic relevance data 415a-n indicating a semantic relevance of the (semantic relevance of the) content candidate data 115a-n to the user input data 105. The semantic relevance data 415a-n may include a numerical value within a configured range, where, depending on system configurations in example embodiments, low values may indicate semantic irrelevance while high values may indicate semantic relevance. In some embodiments, the semantic relevance data 415a-n may include a natural language description of the semantic relevance (e.g., "is highly relevant", "is not relevant", "is somewhat relevant", etc.).

As shown in FIG. 4, the numerical feature data 137a-n may be sent to the numerical feature type encoder 420a-n. The numerical feature type encoder 420a-n may be configured to determine a numerical relevance (e.g., correlation) between a user input and (particular semantic features of) a particular content candidate. The numerical feature type encoder 420a-n may be configured to encode a numerical feature(s) into a latent space (e.g., associated with a feature type corresponding to the numerical feature(s)) to generate a value (e.g., a score) representing the numerical relevance between (numerical features corresponding to) the content and the user input. For example, for a user input including "find me a highly recommended [entertainment venue] near me", the numerical feature type encoder 420a-n may generate a value (e.g., a numerical relevance value) indicating first content is numerically relevant to the user input based on the numerical features corresponding to the second content (e.g., distance, ratings, reviews etc.) indicate that the first content corresponds to a [venue] that is “close”, has an “excellent” or “high” rating, and has “many” customer reviews. In contrast, the numerical feature type encoder 420*a-n* may generate a value indicating second content is not (or less) numerically relevant to the user input based on the numerical features corresponding to the second content indicating that the second content corresponds to a [venues] that is “very far”, has a “poor” or “low” rating, and/or “few” reviews. The numerical feature type encoder 420*a-n* may include one or more ML based (e.g., neural network based, multilayer perceptron based) encoders configured (e.g., trained) to encode (e.g., generate embeddings for) the numerical features and/or user inputs.

As shown in FIG. 4, the numerical feature type encoder 420*a-n* processes the numerical feature data 137*a-n* to generate numerical relevance data 425*a-n* indicating a numerical relevance of the (numerical features corresponding to the) content candidate data 115*a-n* to the user input data 105. In some embodiments, the numerical feature type encoder 420*a-n* may correspond to a neural network trained to process as described herein. As described herein, in some embodiments, the numerical feature type encoder 420*a-n* may be configured (e.g., trained) based on representations of how (particular) numerical features effect a relevance of corresponding content.

In some embodiments, the numerical feature type encoder 420*a-n* may correspond to one or more numerical feature type encoders. In some embodiments, a numerical feature type encoder may be configured to determine a numerical relevance of a particular numerical feature to a user input. For example, a first numerical feature type encoder of the numerical feature type encoder 420*a-n* may be configured to determine a numerical relevance of a distance numerical feature corresponding to a particular content candidate, a second numerical feature type encoder of the numerical feature type encoder 420*a-n* may be configured to determine a numerical relevance of a rating numerical feature corresponding to the content candidate, a third numerical feature type encoder of the numerical feature type encoder 420*a-n* may be configured to determine a numerical relevance of a review count numerical feature corresponding to the content candidate, and so on. In some embodiments, the numerical feature type encoder 420*a-n* may include one or more numerical feature type encoders configured to determine a numerical relevance of one or more of the numerical feature types discussed herein (e.g., n numerical feature type encoders each configured to determine a numerical relevant of one of n numerical feature types).

The semantic relevance data 415*a-n* and the numerical relevance data 425*a-n* may be sent to the candidate ranking component 430. The candidate ranking component 430 may be configured to generate a relevance metric (e.g., value) representing the relevance of retrieved content to a user input based on the semantic relevance value and numerical relevance values generated for the semantic and numerical features corresponding to the content. In some embodiments, the candidate ranking component 430 may determine the metric based on applying weights to the semantic relevance value and numerical relevance values. The weights may represent a learned importance (e.g., relevance) of a particular content feature or type of content feature. For example, the content ranking component may be configured to perform a learnable weighted sum operation(s) to the semantic relevance value and the numerical relevance values.

In some embodiments, the candidate ranking component 430 may apply different weights to relevance values generated based on different heterogenous features (e.g., relevance values generated based on numerical features vs. semantic features). For example, a semantic feature (e.g., a name, address, semantic representation of “very close”, etc.) may be determined to be more important to an overall relevance of content to a user input than a (particular) numerical feature (e.g., a review count) and, therefore, a different weight may be applied to the semantic relevance value than the (particular) numerical relevance value.

In some embodiments, the candidate ranking component 430 may apply different weights to different numerical relevance values. For example, a first numerical feature type (e.g., a distance or rating) may be determined to be more important to an overall relevance of content to a user input than a second numerical feature (e.g., a review count) and, therefore, a different weight may be applied to the numerical relevance value determined based on the first numerical feature type than the numerical relevance value determined based on the second numerical feature type.

The candidate ranking component 430 may correspond to or implement an ML model (e.g., multilayer perceptron, a neural network, etc.). The ML model may be trained using example semantic relevance values and numerical relevance values. The ML model may be tasked with generating a corresponding a relevance metric based on the example relevance values. The output of the ML model (e.g., the metric) may be compared to a ground-truth output (e.g., label) to determine a performance of the ML model. The ML model (e.g., model parameters) may be modified (e.g., adjusted) to minimize a loss function associated with the determined performance (e.g., using backpropagation, gradient descent, etc.).

The candidate ranking component 430 may process the semantic relevance data 415*a-n* and the numerical relevance data 425*a-n* to generate candidate ranking metric data 145*a-n*. As described in relation to FIG. 1, the candidate ranking metric data 145*a-n* may be sent to the output handler component 150.

The ranking model 140 (e.g., one or more components thereof) may be trained using a training data set including a plurality of positive and negative examples of content relevant to an input. In some embodiments, the training data set may include one or more training examples. A positive training example may correspond to, or otherwise include, an example user input and a corresponding, relevant content candidate. In some embodiments, the content included in a positive training example may correspond to content determined to satisfy a condition (e.g., meet a threshold amount of relevance to the user input. A negative training example may correspond to, or otherwise include, an example user input and a corresponding, irrelevant, or otherwise suboptimal content candidate. In some embodiments, the content included in a positive training example may correspond to content determined to fail to satisfy a condition (e.g., meet a threshold amount of relevance to the user input. In some embodiments, a training example of the training data may further include a label indicating whether the training example is positive or negative and/or whether the content of the training example is relevant to the user input. In some embodiments, the label may be a metric (e.g., a value). The ranking model 140 may be configured (e.g., trained) using the training dataset. For example, the training dataset may be used to perform supervised learning to generate (e.g., configure) the ranking model 140.

In some embodiments, the language model 410, the numerical feature type encoder 420*a-n*, and/or the candidate ranking component 430 may correspond to one or more layers (e.g., sub neural networks) of a neural network of the ranking model 140.

In some embodiments, the training of the ranking model 140 may include joint training of the language model 410, the numerical feature type encoder 420*a-n*, and/or the candidate ranking component 430. For example, the language model 410, the numerical feature type encoder 420*a-n*, and/or the candidate ranking component 430 may process as described herein with respect to training data of the training dataset (or data generated based on the training data) to generate a final output (e.g., the ranking metric). One or more of (the model parameters of) the language model 410, the numerical feature type encoder 420*a-n*, and/or the candidate ranking component 430 may be modified based on an evaluation of the ranking metric. In some embodiments, the training of the ranking model 140 may include the separate training of the language model 410, the numerical feature type encoder 420*a-n*, and/or the candidate ranking component 430. For example, model parameters corresponding to one or more of the language model 410, the numerical feature type encoder 420*a-n*, and/or the candidate ranking component 430 may be frozen (e.g., not modified) during training of model parameters corresponding to one or more of the other of language model 410, the numerical feature type encoder 420*a-n*, and/or the candidate ranking component 430.

In some embodiments, the configuring (e.g., training) of a model (e.g., an untrained version of the ranking model 140, such as an untrained neural network) may employ a Binary Cross Entropy (BCE) loss function to configure parameters (e.g., model parameters, such as weights) of the model based on the performance of the model when processing with respect to the training dataset.

In some embodiments, the performance of the model during the configuring (e.g., training) process may be evaluated using one or more metrics. For example, the evaluation metrics may include a Mean Reciprocal Rank (MRR), HitRate, and/or Precision. In some embodiments, the metrics may include a metric specific to the task of ranking content. For example, the metric may be used for measuring the accuracy of a rank (e.g., a ranking metric) assigned to a content candidate based on whether the rank assigned to the content is lower or higher than the ground-truth rank for the content. For example, the metric may be used for further decreasing the evaluated performance of the model when the model ranks relevant content lower than it should be.

In some embodiments, the processing described herein may be performed for the tokenized semantic feature data and numerical feature data corresponding to a batch input of the batch input data 315*a-n*. In some embodiments, the processing of at least two or more instances of tokenized semantic feature data and numerical features data corresponding to two or more batch inputs may be performed at least partially in parallel.

As described herein, ranking (or otherwise evaluating) content candidates based on heterogenous features (e.g., semantic features and numerical features) enable, or otherwise configured, the system to understand richer, more complex relationships and/or connections between a content candidate and a user input when evaluating the relevancy of the content candidate. For example, the system 100 may be configured to consider both semantic and numerical features corresponding to a content candidate(s) to determine a relevance of the content candidate(s). For instance, for a user input including "Find highly rated sushi restaurants", the system 100 may process as described herein to rank a first content candidate, having a 5.0 rating and "Excellent" semantic representation of the rating, higher than a second content candidate having a 4.9 rating and "average service".

For further example, the system 100 may be configured to consider various types of semantic and numerical features corresponding to a content candidate(s) to determine a relevance of the content candidate(s). For instance, if the previous example user input included "Find highly rated sushi restaurants near me", the system 100 may process as described herein to further rank the content candidates based on a distance from user.

As another example, the system 100 may be configured to consider both numerical and semantic representations of features corresponding to a content candidate(s) to determine a relevance of the content candidate(s). For instance, for the example user inputs above, the system 100 may consider both a numerical and semantic representation of the rating and distance (e.g., using the language model 410 and the numerical feature type encoder 420*a-n*) to determine a relevance (and ranking) of the content candidates.

As another example, using such heterogenous features enables the system to respond to granular user inputs. For instance, for a user input "find restaurants with excellent service", the system may determine a particular restaurant is relevant based on extracted numerical features indicating the restaurant has a plurality of reviews and a high rating. For further instance, for a user input "find an old movie with [actor]", the system may determine a particular movie is relevant based on extracted numerical features, or a semantic representation thereof, corresponding to a release date. A system configured using the techniques described herein may be configured to semantically understand the criteria of "excellent service" or "old" and its connection to a numerical feature(s) (e.g., a review count and/or rating or a release date, respectively) when evaluating a content candidate, such as based on a semantic representation of the numerical feature.

Figure 5:
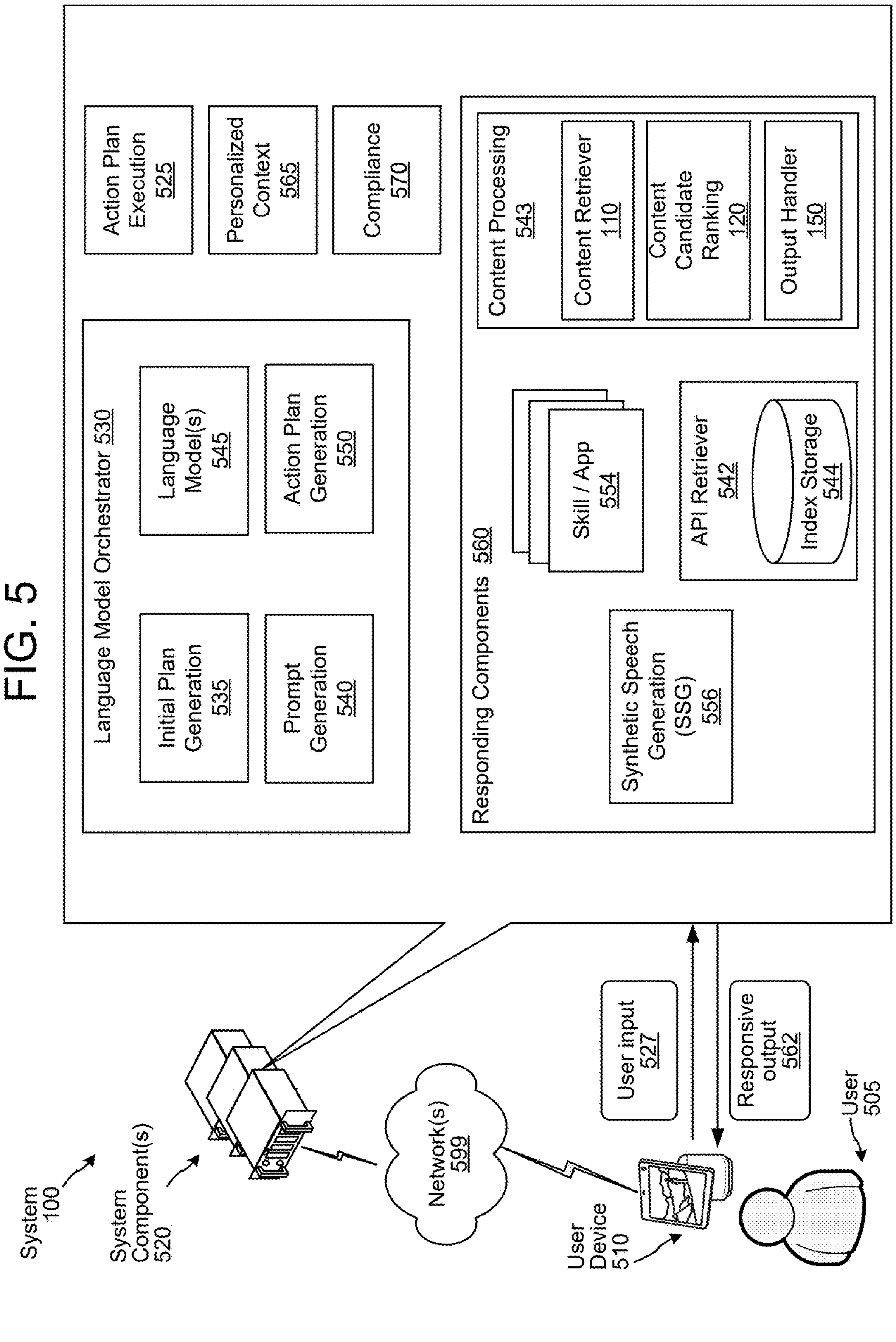
FIG. 5 is a conceptual diagram illustrating example components of a system configured to use a language model to determine a response to a user input, according to embodiments of the present disclosure.

FIG. 5 illustrates further example components included in the system 100 configured to use a language model-based approach to determine an action to be performed in response to a user input and determine a response to be presented to a user 505. As shown in FIG. 5, the system 100 may include a user device 510, local to the user 505, in communication with one or more system component(s) 520 via a network(s) 599. The network(s) 599 may include the Internet and/or any other wide- or local-area network, and may include wired, wireless, and/or cellular network hardware.

In some embodiments, the system component(s) 520 may include various components that may support processing by a language model, such as a language model orchestrator component 530. In example embodiments, the language model orchestrator component 530 may include an initial plan generation component 535, a prompt generation component 540, at least one language model 545, and an action plan generation component 550. The system component(s) 520 may further include an action plan execution component 525 configured to facilitate/cause performance of actions that may be determined by the language model 545. The system component(s) 520 may further include one or more responding components 560 that may perform the actions.

The responding components 560 may be configured to perform an action related to a user input, including, but not limited to retrieving information potentially relevant for determining a response to the user input (e.g., data from a knowledge base, Internet search, database, an application, etc.; context related to the interaction; relevant exemplars for a prompt to the language model; relevant application programming interfaces (APIs); relevant content (e.g., POIs, such as restaurants, shops, etc., and/or products, events, entertainment, etc.), operating a user device (e.g., a smart home device such as a TV, lights, a kitchen appliance, etc.), determining a synthesized speech output, or other actions described herein. As shown in FIG. 5, the responding components 560 may include an API retriever component 542 (further described below), a synthesized speech generation (SSG) component 556, one or more skill/app components 554, a content processing component 543 (including the content retriever component 110, the content candidate ranking component 120, and the output handler component 150 discussed herein), and other components described herein.

APIs are a way for one program/component to interact with another. API calls are a mechanism by which the program/component interact. An API call, or API command, is a message sent to a system component asking an API to perform an action, provide a service or information, or the like. An API call may be formatted for the particular API and may include a particular command, optionally using particular arguments and argument values. API calls may be used for a variety of purposes, such as controlling other devices (e.g., an API call of turn_on_device (device="indoor light 1") corresponds to a command for a component to turn on a device associated with the identifier "indoor light 1"), obtaining information from other components (e.g., an API call of InfoQA.question ("Who is the president of USA?") corresponds to a command for a component to find and provide an answer to the indicated question), and performing other actions (e.g., generating synthesized speech, searching data sources, etc.). The system 100 may interact with the responding components 560 via API calls.

The language model orchestrator component 530 may be configured to orchestrate processing by the language model 545. In some embodiments, the language model 545 may be configured to perform one or more stages of processing, which may be referred to as a task generation stage, an action (or directive) generation stage, and a response generation stage.

The processing stages may be performed in a particular order. For example, during a first stage of processing, the language model 545 may be tasked with performing task generation to generate a list of tasks to be performed in order to respond to a user input. During a second stage of processing, based on the list of tasks, the language model 545 may be tasked with performing action generation to generate action requests (or directives) for a responding component(s) 560 to perform an action(s) related to the tasks/user input. During a third stage of processing, based on information received from the responding component(s) 560, the language model 545 may be tasked with generating a response to the user input and/or causing a component(s) of the system 100 to perform further action(s). Further details are described herein in relation to FIG. 6.

In some cases, a subset of the stages may be performed. For some user inputs, the language model 545 may only perform the task generation stage and the response generation stage, where a response to a user input is generated by the language model 545 using parametric knowledge. For example, for a user input "What kind of fruit is lemon?", the language model 545 may determine that the task is to answer the user's question and may generate a response "Lemon is a citrus fruit that grows on tress" based on the model's parameter knowledge learned during configuration/training operations. In such examples, the language model 545 may not determine an action that is to be performed using a system component, such as sending a request for information to a knowledge base (e.g., the language model 545 may respond without using external knowledge).

In some embodiments, the system may use Retrieval-Augmented Generation (RAG) techniques to inform processing of a language model. RAG techniques may involve referencing an authoritative knowledge base or other type of data source outside of the model's training data sources before generating a response by the model. RAG techniques may extend the already powerful capabilities of language models to specific domains, an organization's internal knowledge base, etc., without the need to retrain the model. In some embodiments, information (e.g., relevant facts, up-to-date information, current/trending topics, etc.) from one or more components (e.g., responding component(s) 560) may be provided to the language model 545 and the model may generate a output based on the received information.

In some embodiments, the language model orchestrator component 530 may be configured to orchestrate processing by multiple different language models, where an individual language model may perform one (or more) of the processing stages described above. For example, a first language model may perform task generation, a second language model may perform action generation, and a third language model may perform response generation. In some embodiments, the language models may be different types of models, for example, a first language model may be a text-to-text generative model, a second language model may be a multi-modal generative model, a third language model may be a text-to-speech generative model, etc. In some embodiments, the language models may be different sizes (e.g., number of parameters), may have different processing capabilities, etc.

Some embodiments may enable use of other components, such as plugins, with the language model 545, where the plugins may add functionality and features to the language model capabilities. For example, the plugins may be used to perform mathematical calculations (e.g., a calculator plugin), statistical analysis (e.g., a statistics plugin), natural language translation, speech generation, etc. For further example, the plugins may additionally, or alternatively, be used to perform an action responsive to a user input based on the response generated by the language model. As a further example, the plugins may cause the language model to process and output according to an enabled plugin, which may result in a different response, reasoning, processing, etc. from the language model than when the plugin is not enabled. In some cases, a user or a system may enable a plugin(s) for use with the language model.

The system component(s) 520 may include other processing components configured to process user inputs and other type of inputs (e.g., sensor data, audio data, data indicative of an event occurring, etc.) received via the user device 510. In example embodiments, the system component(s) 520 may process spoken inputs using ASR processing. The system component(s) 520 may also be configured to process non-spoken inputs, such as gestures, textual inputs, selection of GUI elements, selection of device buttons, etc. The system component(s) 520 may also include other components to understand an input, determine an action to be performed in response to receiving the input, generate an output responsive to the input, and the like. Such other components may perform natural language processing, SSG processing, etc., some of which are described herein in relation to FIG. 7.

Figure 6:
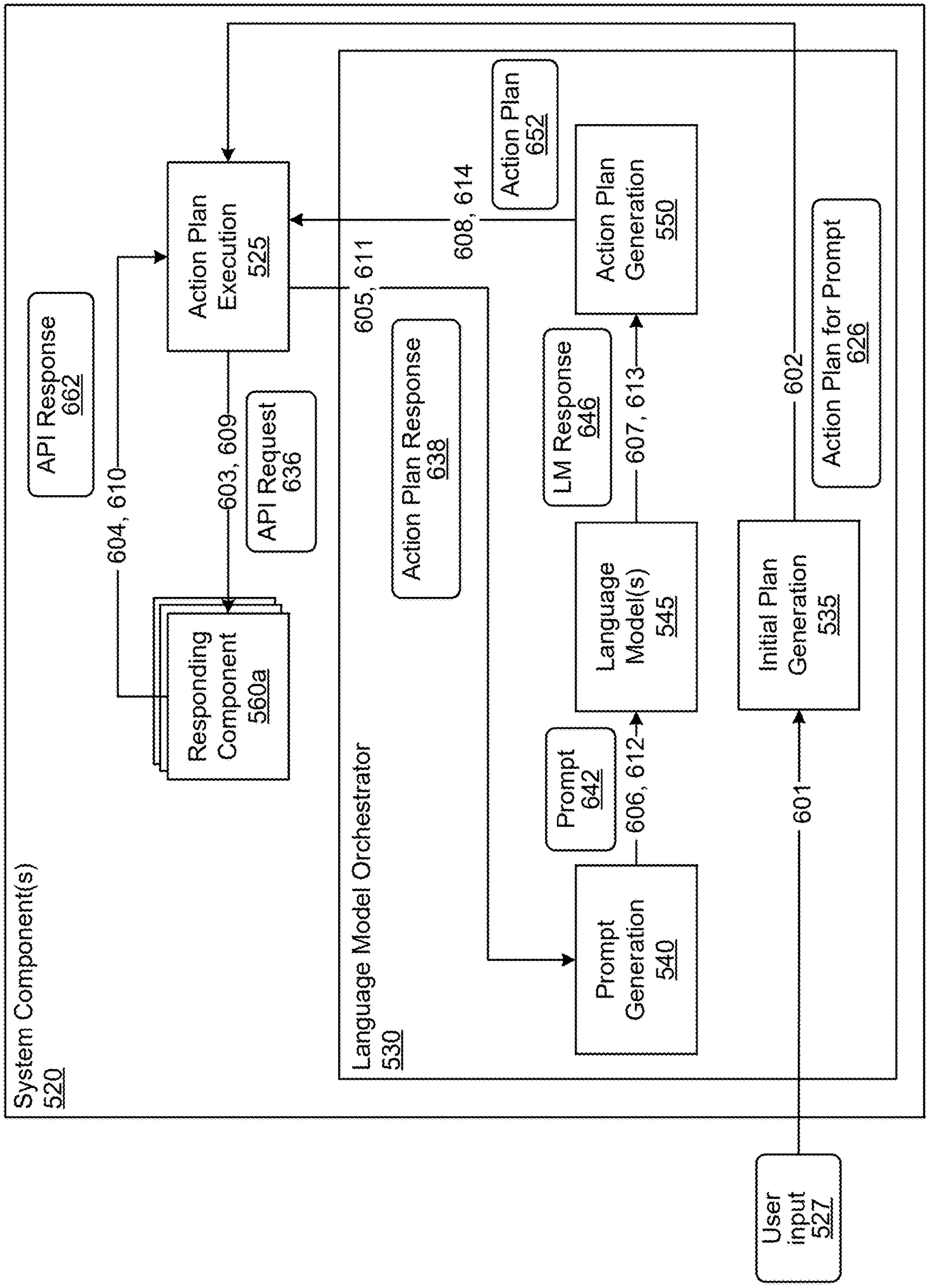
FIG. 6 is a conceptual diagram illustrating example processing of the system configured to use a language model, according to embodiments of the present disclosure.

As shown in FIG. 5, the system component(s) 520 may receive user input data 527, which may be provided to the language model orchestrator component 530 (as shown in FIG. 6). In some instances, the user input data 527 may include one or more types of data, such as text (e.g., a text or tokenized representation of a user input), audio, image, video, etc. Such data may be encoded/embedded data that represent the underlying type of data (e.g., text, audio, image, etc.). For example, the user input data 527 may include text (or tokenized) data when the user input is a natural language user input. In some embodiments, an ASR component 750 of the system 100 may receive audio data representing a spoken natural language user input from the user 505. The ASR component 750 may perform ASR processing on the audio data to determine ASR data representing the spoken user input, which may correspond to a transcript of the user input. As described herein, with respect to FIG. 7, the ASR component 750 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 750 level of confidence that the corresponding hypothesis represents what the user said. The ASR component 750 may also determine token scores corresponding to each token/word of the ASR hypothesis, where the token score indicates the ASR component's 750 level of confidence that the respective token/word was spoken by the user. The token scores may be identified as an entity score when the corresponding token relates to an entity. In some instances, the user input data 527 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 527). As a further example, the user input data 527 may include image data representing information being displayed at the user device 510 (e.g., on-screen context data) when the user 505 provides the user input or at substantially the same time as the user 505 provides the user input. As yet a further example, the user input data 527 may include audio data representing audio signals (e.g., background noise, audio from other devices such as TV, appliances, etc.) occurring in the environment of the user 505 that can be captured by the user device 510 (e.g., audio environment context). As yet a further example, the user input data 527 may include image data representing one or more objects in the environment of the user 505 (e.g., visual environment context). As yet a further example, the system may receive image data including text (and other data), and the user input data 527 may include text determined from the image data using optical character recognition or other techniques.

In some embodiments, the system component(s) 520 may receive input data that may not be provided directly/explicitly by a user. Such other type of input data may be processed in a similar manner as the user input data 527 as described herein. Such other type of input data may be received in response to detection of an event. Example events include change in a device state (e.g., front door opening, garage door closing, TV turned off, thermostat detecting a particular temperature, etc.), occurrence of an acoustic event (e.g., baby crying, appliance beeping, glass breaking, etc.), presence of a user (e.g., a user approaching the user device 510, a user entering the home, etc.), occurrence of an event indicated by a user (e.g., a reminder/notification requested by the user, sporting event score change, start of a TV program, calendar event, etc.), and others. In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100, for example, the language model orchestrator component 530 may process the input data and may cause performance of an action. For example, in response to detecting a garage door opening, the system 100 may cause garage lights to turn on, living room lights to turn on, etc. As another example, in response to detecting an oven beeping, the system 100 may cause a user device 510 (e.g., a smartphone, a smart speaker, etc.) to present an alert to the user. The language model orchestrator component 530 may process the input data to generate tasks (e.g., an action plan) that may cause the foregoing example actions to be performed.

FIG. 6 illustrates example processing of the user input data 527 by the system component(s) 520 using the language model 545. Although the figure and discussion of the present disclosure illustrate certain components and steps in a particular order, the components may be implemented in a different manner (as well as certain components removed or added) and the steps described may be performed in a different order (as well as certain steps removed or added) without departing from the present disclosure.

In some embodiments, the language model 545 may perform iterative processing (e.g., multiple processing cycles, multiple processing stages, etc.) with respect to individual user input data 527. Such iterative processing is illustrated and described herein with respect to FIG. 6. For example, in a first iteration of processing the language model 545 may receive a first prompt from the prompt generation component 540, in response to which the language model 545 may determine one or more tasks to be performed with respect to the user input data 527, then at least one of the determined task(s) may be performed via the action plan execution component 525, the results of the performed task(s) may be provided to the language model 545 via a second prompt, in response to which the language model 545 may determine further tasks to be performed or may determine that a (final) response to the user input is determined.

The initial plan generation component 535 may be configured to determine various information relevant to processing of the user input data 527 by the language model orchestrator component 530. The initial plan generation component 535 may generate an action plan (e.g., action plan for prompt data 626) representing one or more tasks/ actions to be performed to determine the various relevant information. The relevant information may be included in a prompt to the language model 545. The initial plan generation component 535 may receive (step 601) the user input data 527 representing a user input from the user 505. Based on the user input data 527, the initial plan generation component 535 may determine information relevant for processing the user input data 527 and may output (step 602) the action plan for prompt data 626. The action plan for prompt data 626 may include one or more tasks to be performed to retrieve the relevant information. The tasks may be represented as action descriptions, API requests/calls, API descriptions, requests to a component(s) (e.g., the responding components 560), and the like. Examples tasks that may be included in the action plan for prompt data 626 may relate to obtaining certain information like context data, user profile data, user preferences, available/relevant exemplars, available/relevant APIs, etc.

In example embodiments, the initial plan generation component 535 may determine one or more types of context data relevant for the user input data 527. Types of context data may include user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.), dialog context (e.g., prior user inputs of a dialog, prior system responses of the dialog, dialog topic, actions performed during the dialog, etc.), and the like. As an example, if the user input data 527 corresponds to operation of a device (e.g., the user input corresponds to a smart home domain), the initial plan generation component 535 may determine that device context information, in particular device states for the devices associated with the user/user profile of the user 505, may be relevant information. As another example, if the user input data 527 corresponds to output of media, such as music, movies, TV shows, etc., the initial plan generation component 535 may determine that user context information, in particular user preference for media genre associated with the user/user profile of the user 505, may be relevant information.

Based on the type of context data determined to be relevant, the initial plan generation component 535 may output the action plan for prompt data 626 to include a request for the type(s) of context data. For example, if device context is relevant information, then the action plan for prompt data 626 may include an API call/description corresponding to a component (e.g., a device state component, a smart home component, a user profile storage, etc.) capable of providing device information. As another example, if user context is relevant information, then the action plan for prompt data 626 may include an API call/description corresponding to a component (e.g., a user profile storage, a personalized context component, etc.) capable of providing user information.

In some embodiments, the initial plan generation component 535 may determine one or more components or types of components that may be relevant for processing the user input data 527. As an example, if the user input data 527 corresponds to operation of a device (e.g., the user input corresponds to a smart home domain), the initial plan generation component 535 may determine that components (e.g., APIs) corresponding to device operation or smart home domain may be relevant, and the initial plan generation component 535 may output the action plan for prompt data 626 to include device operation components or smart home domain components. As another example, if the user input data 527 corresponds to output of media, the initial plan generation component 535 may determine components corresponding to media output or music domain may be relevant, and the initial plan generation component 535 may output the action plan for prompt data 626 to include media output components or music domain components.

In some embodiments, the initial plan generation component 535 may determine a query to retrieve exemplars and/or APIs relevant for processing the user input data 527 using the language model 545. As used herein, an exemplar refers to information that may be included in a prompt to a language model that provides an example of how the language model is to process or respond, including, among other things, what actions the language model can request performance of. A prompt may include more than one exemplar. Few shot learning or in-context learning by the language model is enabled by including the exemplars in the prompt. The query (or request) to retrieve relevant exemplars and/or APIs may be included in the action plan for prompt data 626. The query (or an API request based on the query) may be processed by the responding component 560 (e.g., an exemplar retriever component, the API retriever component 542, the content processing component, 543 etc.). The query, in some embodiments, may include the user input data 527 or a portion or representation thereof.

The initial plan generation component 535 may employ one or more techniques to determine relevant information or to determine the tasks to obtain relevant information. Examples of such techniques include using one or more of machine learning models (e.g., classifiers), statistical models, rules engines, etc. to determine the relevant information. The initial plan generation component 535 may determine a topic/category corresponding to the user input data 527, a (semantically or lexically) similar past user input and relevant information corresponding to the similar past user input, and the like.

In example embodiments, the initial plan generation component 535 may use a language model to determine the types of information relevant for processing the user input data 527. The initial plan generation component 535 may input a prompt to the language model, for example, "What types of information is relevant for responding to the user input: [user input data 527]", and the language model may output one or more types of context data, one or more types of components, etc. that may be relevant. In some embodiments, the initial plan generation component 535 may input a prompt to the language model 545 requesting relevant information for the user input data 527.

The action plan for prompt data 626, which includes types of relevant information for the user input data 527 or tasks to be performed to obtain the relevant information, may be processed by the action plan execution component 525 to retrieve the relevant information. The action plan execution component 525 may process the action plan for prompt data 626 to generate one or more requests to perform an action (e.g., API requests 636) for a particular responding component 560. For example, if the action plan for prompt data 626 indicates that device information/context is relevant, then the action plan execution component 525 may generate an API request 636 for a responding component 560*a* capable of providing the device information, where the API request 636 may include a user profile identifier associated with the user 505, a device identifier associated with the user device 510, and/or other information based on information required in the API call for the responding component 560*a*.

The API request 636 may be sent (step 603) to the corresponding responding component(s) 560. The responding component(s) 560 may include components that the action plan execution component 525 may communicate with via API requests or other type requests. As shown in FIG. 5, the responding component(s) 560 may include one or more skill/app components 554, the SSG component 556 (e.g., configured to convert input data to audio data representing synthesized speech), the API retriever component 542 (e.g., configured to provide APIs and corresponding information supported by the system 100) and the content processing component 543 (e.g., configured to facilitate the processing described herein in connection with FIGS. 1-4 to determine relevant, responsive content using heterogenous information associated with the content). The responding component(s) 560 may also include an orchestrator component 730 (e.g., configured to facilitate processing by other system components 520 such as those shown in FIG. 7), a context source component (e.g., configured to provide user context data, device context data, environmental context data, dialog context data, personalized context data, etc.), a multimodal response component (e.g., configured to respond to a user input via outputs in more than one data form), a content moderation component (e.g., configured to moderate certain types of content such as biased content, harmful content, offensive content, etc.), a smart home devices component (e.g., configured to provide device information such as device state, device capabilities, etc.), a language model-based agent (e.g., a component that uses a language model (e.g., a LLM) or other type of generative model to provide information), an exemplar provider component (e.g., configured to respond to a query for relevant exemplars), a knowledge base component (e.g., including one or more knowledge bases or other structured data that can be searched to obtain information), an entity resolution component (e.g., configured to determine specific entities corresponding to entities represented in a user input or language model output), and the like.

In response to receiving the API request 636 (at step 603), the responding component(s) 560 may provide (step 604) an API response(s) 662 to the action plan execution component 525. At step 603, the API request(s) 636 is based on the action plan for prompt data 626, and thus, at step 604, the API response(s) 662 may include information relevant for processing the user input data 527. In examples, the API response(s) 662 may include relevant context information (e.g., device context, user context, environment context, dialog context, personalized context, etc.), relevant APIs and/or API descriptions for processing the user input data (e.g., API(s) for operating devices, API(s) for outputting media content, etc.), relevant exemplars, relevant content, and other relevant information requested via the action plan for prompt data 626.

In example embodiments, the API request 636 may be sent to the API retriever component 542. In such cases, the API request 636 may include a query to retrieve relevant APIs based on the user input data 527. The API retriever component 542 may be configured to receive a search query and output one or more APIs or API data corresponding to (e.g., satisfying, matching, etc.) the search query. API data may include an API call, an API description, and other information associated with the API. In some embodiments, the API retriever component 542 may include or may be in communication with an index storage 544 (shown in FIG. 5). The index storage 544 may store various information associated with multiple APIs. Examples of information stored in the index storage 544 include: API/component descriptions (e.g., a description of one or more function that the API can be used to perform), API arguments (e.g., parameter inputs, input types, examples of input values, examples of output values, output type, etc.), identifiers for components corresponding to the API (e.g., alphanumerical component ID, component name, etc.), and other information. In some embodiments, the index storage 544 may include other information associated with the API, such as historical accuracy/defect rate, historical latency value, feedback (e.g., user satisfaction/feedback, system-based feedback), etc. The index storage 544 may also include sample user inputs corresponding to the API, where the sample user input may represent a user input for which the API can perform an action for.

The API retriever component 542 may apply one or more retrieval techniques to determine API data corresponding to the search query. For example, the API retriever component 542 may compare one or more APIs included/represented in the index storage 544 to the user input data 527 represented in the search query to determine one or more APIs (top-k list). Such comparison may involve a semantic comparison between the user input data 527 and the API data. In some embodiments, the API retriever component 542 may use a neural-based retrieval technique that may involve determining an encoded representation of the user input/search query and comparing (e.g., using cosine distance) the encoded representation(s) of the API data in the index storage 544. The relevant APIs may be included in the API response 662.

In a non-limiting example, for a user input "book a flight", the API retriever component 542 may determine one or more API calls corresponding to booking a flight (e.g., Bookflight.location ("departing airport code", "arrival airport code"), Bookflight.date ("departing date"), bookflight-.rountrip ("departing location", "arrival location", "departure date", "return date"), AirlineBookFlight ("departing airport code", "arrival airport code"), etc.).

Some embodiments may include an exemplar provider component that may operate in a similar manner as the API retriever component 542 in terms of implementing one or more retrieval techniques to determine exemplars corresponding to (e.g., satisfying, matching, etc.) a search query based on the user input data 527. The exemplar provider component may search an index storage including various information related to multiple different exemplars. In some embodiments, the index storage may include sample user inputs associated with an exemplar, and the relevant exemplars may be retrieved based on a comparison of the sample user inputs and the user input data 527. The retrieved exemplars may be included in the API response 662.

The information from the API response(s) 662 may be included in a prompt to the language model 545. The action plan execution component 525 may determine action plan response data 638 based on the API response(s) 662. The action plan execution component 525 may combine (e.g., aggregate, summarize, de-duplicate, etc.) multiple API responses 662 to generate the action plan response data 638. In some examples, the action plan response data 638 may be the same or similar to the API response(s) 662. The action plan execution component 525 may send (step 605) the action plan response data 638 to the prompt generation component 540.

Using the action plan response data 638, the prompt generation component 540 may determine prompt 642 for the language model 545. The prompt 642 may be a natural language input (e.g., a natural language request, a natural language instruction, etc.). In some embodiments, the prompt 642 may include information in a manner that the language model 545 is trained for. The prompt generation component 540 may send (step 606) the prompt 642 to the language model 545, where the prompt 642 may include the user input data 527 (or a representation of the user input data 527) and the relevant information for processing the user input data 527. For example, the prompt 642 (at step 606) may include relevant context data, relevant APIs or API descriptions, etc. that may be included in the action plan response data 638. In some embodiments, the prompt 642 may include a request or directive for the language model 545 to respond to the user input data 527. In some embodiments, the prompt 642 may include one or more exemplars (e.g., in-context learning examples) for processing the user input data 527.

The prompt 642 may include indicators (e.g., labels, specific tokens, etc.) to identify certain information. In example embodiments, the prompt 642 may include a "User" indicator (to indicate that the following string of characters/tokens are the user input), an "Exemplar" indicator (to indicate exemplars), and so on.

In some embodiments, the prompts for the language model described herein may include a request for the language model to output a response that satisfies certain conditions. Such conditions may relate to generating a response that is unbiased (toward protected classes, such as gender, race, age, etc.), non-harmful, profanity-free, etc. For example, prompt data generated by a prompt generation component described herein may include "Please generate a polite, respectful, and safe response and one that does not violate protected class policy."

In some embodiments, the prompt 642 may include an indication the processing stages (e.g., the task generation stage, the action generation stage, and the response generation stage) that the language model 545 is to perform. In some examples, for the task generation stage, the prompt 642 may direct the language model 545 to generate an output (e.g., tokens) representing the model's interpretation of the user input and/or one or more tasks to be performed to respond to the user input (the model output may be, for example, the user is requesting [intent of the user input], the user wants to [desired user action], need to determine [information needed to properly process the user input], etc.). For the task generation stage, the prompt 642 may also direct the language model 545 to prioritize a list of tasks to be performed, if more than one task is to be performed and select one (or more) task for the current iteration of processing.

In some examples, for the action generation stage, the prompt 642 may direct the language model 545 to generate an output (e.g. tokens) representing an action(s) (or directive(s)) and/or an API call(s) corresponding to the user input, where performance of the action(s) or execution of the API(s) can be done to retrieve information to determine a response to the user's input, perform the user requested action, retrieve information/data to perform other tasks on the task list, etc. In some examples, for the action generation stage, the prompt 642 may direct the language model 545 to process the results of the action(s)/API(s) determined by the language model 545, and to determine whether a response to the user input can be generated or whether there are further tasks to be performed from the task list.

In some examples, for the response generation stage, the prompt 642 may direct the language model 545 to generate an output (e.g., tokens) representing a response (e.g., a final response) to the user input data 527. In examples, the language model 545 may be directed to generate the response based on the results of performing the action(s)/API(s).

The prompt generation component 540 may send (step 606) the prompt 642 to the language model 545, which may process the prompt 642 to generate a language model (LM) response 646. The LM response 646 may be a natural language output generated based on the prompt 642. The LM response 646 may include text tokens. In other embodiments, where the language model 545 may be a multi-modal model, the LM response 646 may include other types of tokens, for example, audio tokens, image tokens, etc.

Based on receiving the prompt 642 at step 606, the language model 545 may generate the LM response 646 at step 607, where the instant LM response 646 may include outputs corresponding to the task generation stage and the action generation stage. The LM response 646 may include an action for determining information relevant to or responsive to the user input data 527. For example, the LM response 646 may include an action to search a knowledge base (e.g., to find a response to a user question), an action to determine information from a particular skill/app or language model-based agent (e.g., to determine current weather information, to determine a cost of an item, to book travel, etc.), an action to operate a device (e.g., turn on lights, set thermostat to a particular temperature, etc.), an action to request information from the user 505, etc.

In some embodiments, the LM response 646 may include an API or API description corresponding to the determined action. For example, the LM response 646 may include an API to operate a device or an API call(s) to output media content. The language model 545 may determine the actions and/or the API information based on the relevant APIs included in the prompt 642. The language model 545 may generate actions and/or API information that is not based on (e.g., correspond to, is similar to, etc.) the relevant APIs included in the prompt 642 (for example, the language model 545 may generate incorrect/unsupported actions and/or API information).

The LM response 646 may follow the format included in the prompt 642 or that the language model 545 is trained to follow. An example prompt 642 may be:

```
{
Please process the following user input and context data to determine at least one action
or API to execute and generate a response to the user.
First determine a task to perform (use "Task" label), then determine an API to perform
the task (use "Action" label), then process the results from the API, and then generate a response
to the user input (use "Response" label). You may determine multiple tasks to perform. You
may have to process iteratively.
User: Turn on living room TV
```

-continued

```
Available context:
   User devices: "living room TV" = [device id]
   "living room TV" device state = Off
Available APIs:
   TurnOn.device (device)
   Turn VolumeUp.device (device)
   SetTVChannel (device, input channel)
}
```

Based on processing the above example prompt 642, an example LM response 646 (at step 607) may be:

```
}
Task: User wants to turn on living room TV that is operation of a user device.
Action: I need an API to operate a device. TurnOn.device (device = "living room TV")
}
```

The LM response 646 may be sent (step 607) to the action plan generation component 550, which may determine action plan data 652. As described herein, the language model 545 may generate tokens in sequence, as such, the language model 545 may generate portions of the LM response 646 in a tokens-by-tokens basis. In some embodiments, the LM response 646 may be processed by the action plan generation component 550 based on the language model 545 generating the tokens representing the action or corresponding to the action generation stage.

The action plan generation component 550 may process the LM response 646 to identify one or more actions/APIs generated by the language model 545. In examples, the action plan generation component 550 may parse the tokens/text included in the LM response 646 to extract tokens/text representing an action or API. In some embodiments, the action plan generation component 550 may be configured to determine one or more components (e.g., responding components 560*a-n*) configured to perform the identified action or API. Based on the LM response 646, the action plan generation component 550 may determine the action plan data 652, which may in turn cause performance of an action (e.g., execution of API calls) to determine a potential response(s) to the user input. The action plan data 652 may include one or more APIs to be executed, where the APIs may be determined based on (e.g., extracted from) the LM response 646. For example, if the LM response 646 includes an action of "determine weather forecast for today" or an API call of "GetWeather.location ([city])", then the action plan generation component 550 may determine the action plan data 652 to include an API call "GetWeather.location ([city])" and include an identifier for the responding component(s) 560*a* (e.g., a weather skill component). Instead of or in addition to an API call, the action plan data 652 may include a request to perform an action, an API description, etc. In some embodiments, the action plan generation component 550 may determine the responding components 560 based on user permissions, subscriptions, authorization or other use-enabling information associated with the user 505 (e.g., included in user profile data).

In some embodiments, the action plan generation component 550 may be configured to determine more than one responding component 560 to perform the action/execute the API indicated in the LM response 646. In some embodiments, the action plan generation component 550 may determine APIs corresponding to multiple responding components 560. For example, for the "GetWeather.location ([city])" API, the action plan data 652 may include an identifier for a first weather skill component, an identifier for a second weather skill component, an identifier for a search engine component, etc.

The action plan data 652 may be sent (step 608) to the action plan execution component 525. The action plan execution component 525 may identify the APIs in the action plan data 652 and generate executable API calls for the corresponding responding components 560. Based on the action plan data (received at step 608), the action plan execution component 525 may generate an additional (a second) API request (or multiple API requests) 636. The (additional/second) API request(s) 636 may be sent (step 609) to the responding component(s) 560. For example, the action plan execution component 525 may send a first API call to a first responding component 560*a* and a second API call to a second responding component 560*b*.

In some cases, the action plan data 652 may include incomplete API calls and the action plan execution component 525 may be configured to generate executable API calls (e.g., complete API calls) corresponding to the action plan data 652.

The action plan execution component 525 may generate one or more executable API calls including one or more parameters using information included in the action plan data 652 and/or various other contextual information (e.g., speaker recognition results, a user ID, user profile information (e.g., age, gender, location, language, geographic marketplace, etc.), device ID, device profile information, device state indicators, a dialog history, and/or a interaction history associated with the user and/or the device, etc.). In some embodiments, the various contextual information may be contextual information not provided to the language model orchestrator component 530. Prior to generating the executable commands, the action plan execution component 525 may modify (e.g., remove, filter, preempt, etc.) a directive included in the action plan data 652 that is determined to be in conflict with a system operating policy. The action plan execution component 525 may generate one or more additional executable commands corresponding to directives not included in the action plan data 652.

In response to receiving the API request(s) 636 (at step 609), the responding component(s) 560 may send (step 610) an (additional/second) API response(s) 662 to the action plan execution component 525. The action plan execution component 525 may determine (additional/second) action plan response data 638 based on the (additional/second) API response(s) 662. The action plan execution component 525 may combine (e.g., aggregate, summarize, de-duplicate, etc.) multiple API responses 662 to generate the action plan response data 638. In some examples, the action plan response data 638 may be the same or similar to the API response(s) 662. In some examples, the action plan response data 638 may include an identifier associated with the responding component 560 that provided the API response 662. For example, the (additional/second) action plan response data 638 may include first weather information from a first weather skill component, second weather information from a second weather skill component, third weather information from a search engine component, etc. In some embodiments, the action plan execution component 525 may remove/filter information from the API response 662 that is determined to include information not beneficial to the processing by the language model 545.

The action plan execution component 525 may send (step 611) the (additional/second) action plan response data 638 to the prompt generation component 540. The information from the API response(s) 662 may be included, by the prompt generation component 540, in a (additional/second) prompt to the language model 545. The prompt generation component 540 may generate the second prompt 642 to include the action plan response data 638 or a representation thereof. The second prompt 642 may also include information from the prior/first prompt (from step 606). For example, the second prompt 642 may include the user input data 527 (or a representation thereof), the relevant information for processing the user input data 527 (e.g., relevant context data, relevant API information, relevant exemplars, etc.), the processing stages information, and the action plan response data 638 (from step 611). In some embodiments, the second prompt 642 may also include at least a portion of the LM response 646 generated during a prior iteration of processing (e.g., the outputs based on performing the task generation stage and the action generation stage) to indicate actions/results of the prior iteration of processing by the language model 545. The second prompt 642 may include an indicator (e.g., label, identifier, etc.) associated with the action plan response data 638 to indicate, to the language model 545, that the string of characters/tokens following the indicator represent information determined based on performance of the actions determined during the action generation stage.

The second prompt 642 may be sent (step 612) to the language model 545 for processing. At this point, the language model 545 may perform the action generation stage of processing the results of the performed actions, which may involve interpreting or understanding the results included in the action plan response data 638. The language model 545 may generate (step 613) a (additional/second) LM response 646 based on the second prompt 642. The second prompt 642 may include a request or directive to the language model 545 to perform further processing with respect to the user input data 527. As described above, the second prompt 642 may provide, among other things, responses/results of performance of the action determined by the language model 545 determined during the prior iteration of processing. The language model 545 may generate further actions to be performed to respond to the user input data 527 (as part of the action generation stage) or may generate a (final/user-facing) response to the user input data 527 (as part of the response generation stage).

An example second prompt 642 may be:

```
{
Please process the following user input and context data to determine at least one
action or API to execute and generate a response to the user.
First determine a task to perform (use "Task" label), then determine an API to
perform the task (use "Action" label), then process the results from the API, and then generate a
response to the user input (use "Response" label). You may determine multiple tasks to perform.
You may have to process iteratively.
User: Turn on living room TV
Available context:
  User devices: "living room TV" = [device id]
  "living room TV" device state = Off
Available APIs:
  TurnOn.device (device)
  Turn VolumeUp.device (device)
  SetTVChannel (device, input channel)
Prior Iteration:
  Action: TurnOn.device (device = "living room TV")
TurnOn.device (device = "living room TV"); API response: "living room TV" device
state = ON
}
```

Based on the above example prompt 642, an example LM response 646 may be:

```
{
Task: User wants to turn on living room TV that is operation of a user device.
Action: I need an API to operate a device. TurnOn.device (device = "living room TV")
Action result is "living room TV" device state = ON
Response: The living room TV is on now. Can I help you with anything else?
}
```

As described herein, the language model 545 may generate the LM response 646 on tokens-by-tokens basis. As such, in some examples, the second LM response 646 may include additional tokens (e.g., newly generated tokens) to the first LM response 646 (from step 607). In other examples, the second LM response 646 may include different tokens than the first LM response 646, where the currently generated tokens may represent outputs for further steps of the action generation stage and/or the response generation stage.

The language model 545 may determine further actions/APIs to be performed in a similar manner as described above. Such further actions/APIs may be based on any tasks, included in the task list generated during the task generation stage, that are still to be performed (e.g., a first task of booking a flight may be done, now a second task of booking a hotel is to be performed). Additionally or alternatively, the further actions/APIs may be based on the results included in the action plan response data 638 (at step 611) (e.g., an API response from a responding component 560 may indicate that additional information is needed to perform an action).

The language model 545 may determine a (final) response to the user input, where the response is to be presented to the user 505 via the user device 510. In other cases, the response may be presented via another user device 510 associated with the user 505. The language model 545 may determine the final response based on the results included in the action plan response data 638 (from step 611). For example, the language model 545 may summarize the results, may combine the results, may generate an interpretation of the results, etc. In a non-limiting example, the language model 545 may combine weather information from two or more responding components (e.g., combine high/low temperature information from a first responding component with humidity information from a second responding component). In another non-limiting example, the language model 545 may interpret results from a knowledge base component to determine a response to the specific user query (e.g., from a biographical search result for a historical person, a birthplace and siblings information may be extracted to determine a response to a user query "tell me about [person's] childhood").

In some examples, the language model 545 may generate the further action to be performed is requesting additional information from the user 505. Such further action, in some embodiments, may be labeled as "Response" so that the action plan generation component 550 may cause a request to be output to the user 505.

The second LM response 646 may be sent (step 613) to the action plan generation component 550, which may determine (step 614) the (additional/second) action plan data 652. In some examples, the second LM response 646 sent to the action plan generation component 550 may include further action(s)/API(s) to be executed, which may be labeled with "Action." In some examples, the second LM response 646 may include a final response to the user input, which may be labeled with "Response."

Based on the tokens corresponding to the "Action" label, the action plan generation component 550 may determine the action plan data 652 to include one or more actions, one or more API calls and/or one or more responding components 560 corresponding to the action(s)/API(s) determined by the language model 545.

Based on the tokens corresponding to the "Response" label, the action plan generation component 550 may determine the action plan data 652 to include one or more actions, one or more API calls and/or one or more responding components 560 to present the output tokens to the user 505 as a response to the user input. For example, the action plan data 652 may include an identifier for the SSG component 556 to cause the output tokens, generated by the language model 545, to be presented as synthesized speech. As another example, the action plan data 652 may include an identifier for the responding component 560 capable of generating outputs in more than one form (e.g., a multi-modal output component) to cause the tokens to be presented as synthesized speech, displayed text/graphics, and/or other types of outputs.

The (second) action plan data 652 may be sent (step 614) to the action plan execution component 525, and as described herein, the action plan execution component 525 may determine executable API calls based on the action plan data 652. If the action plan data 652 represents additional actions to be performed, then the action plan execution component 525 may cause the corresponding responding component(s) 560 to perform the additional action(s) and corresponding response(s) (e.g., API responses 662) may be communicated to the prompt generation component 540 (via the action plan execution component 525 and action plan response data 638) to initiate another iteration of processing by the language model 545 with respect to the user input data 527. If the action plan data 652 represents a response to be presented to the user 505, then the action plan execution component 525 may cause the corresponding responding component(s) 560 to determine output data (e.g., responsive output data 562 shown in FIG. 5) that may be presented via the user device 510. For example, the responsive output data 562 may be sent to the user device 510 via the orchestrator component 730 or another system component(s) 520 (described in relation to FIG. 7).

In some embodiments, when further actions are generated by the language model 545 to be performed with respect to the user input data 527, the language model orchestrator component 530 may perform another iteration of processing, which may involve generating another prompt 642 to the language model 545, generating another LM response 646 that may be used to determine further action plan data 652. The language model 545 may generate tokens corresponding to the action generation stage and/or the response generation stage during the further iteration.

In some embodiments, when a final response is generated by the language model 545, further processing with respect to the user input data 527 by the language model orchestrator component 530 may be ceased (e.g., processing with respect to the user input data 527 by the language model orchestrator component 530 may be complete). The language model orchestrator component 530 may process with respect to a subsequently received user input, which may or may not be part of the same dialog session as the prior/already processed user input data 527.

The responsive output data 562 may include one or more of output audio data representing synthesized speech, text data for display, image for display, graphics/icons for display, media (e.g., video, music, background music, notification sounds, etc.) for playback, and other data. In some embodiments, the responsive output data 562 may include placement information representing where (e.g., top banner, left portion, center of screen, overlay on current visual, etc.) on the display screen of the user device 510 the output data is to be displayed. In some embodiments, the responsive output data 562 may be determined/provided by the responding component 560. In some embodiments, another system component 520 may process the responsive output data 562 prior to sending to the user device 510 to ensure that the responsive output data is formatted for the particular user device 510.

Referring again to FIG. 5, as shown, the system component(s) 520 may include a compliance component 570. In some embodiments, the compliance component 570 may be included in the language model orchestrator component 530. In other embodiments, the compliance component 570 may be one of the responding components 560 and the action plan generation component 550 may cause the action plan execution component 525 to send an API request to the compliance component 570 when processing by the compliance component 570 is to be performed.

The compliance component 570 may be configured to determine whether an output of the language model 545 is appropriate for output to the user 505. In some embodiments, the compliance component 570 may be configured to process language model output (e.g., the LM response 646) representing outputs/tokens generated by the language model 545 during processing of the user input data 527. The model output may include tokens generated during the task generation stage, the action generation stage or the response generation stage. The compliance component 570 may also or instead determine whether an input to the language model 545 (e.g., a user request, an output of another system component of the system 100) is appropriate and/or that the input will result in the language model 545 generating an output that is appropriate to present to the user 505. For this determination, the compliance component 570 may process the user input data 527 or a portion or representation thereof. In some embodiments, the compliance component 570 may process other data (e.g., context data, user profile data, system configuration/policy data, etc.) to determine whether the generated response and/or the input is appropriate.

In some embodiments, the compliance component 570 may determine whether the model output/LM response 646 and/or the user input data 527 corresponds to training data used to configure the language model 545 (e.g., the model output or user input is semantically or lexically similar to the training data, the model output or user input corresponds to functionality (e.g., topics, categories, actions, etc.) that the model is trained for, etc.). Additionally or alternatively, the compliance component 570 may determine whether the model output/LM response 646 and/or the user input data 527 corresponds to one or more words or phrases determined to be confidential, sensitive, or offensive. Additionally or alternatively, the compliance component 570 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some embodiments, the compliance component 570 may use one or more techniques to determine whether the model output or the user input is appropriate; such techniques may include a rules-engine, a word-based similarity determination, a machine learning model-based determination (e.g., using a classifier to classify model output or user input to appropriate category or inappropriate category), etc.

In some embodiments, the compliance component 570 may process the user input data 527 when it is received by the language model orchestrator component 530 and in some cases may process in parallel to the language model orchestrator component 530. In some embodiments, the compliance component 570 may process the model output as the language model 545 generates the output tokens. In other embodiments, the compliance component 570 may process the model output after the language model 545 has generated tokens for a particular processing stage (e.g., after the task generation stage is completed, after the action generation stage is completed, after the response generation stage is completed, etc.).

If the compliance component 570 determines that the model output or the user input data 527 is appropriate, then the language model orchestrator component 530 may continue processing with respect to the user input data 527. If the compliance component 570 determines that the model output is not appropriate, then one or more remedial actions may be performed. One example remedial action may involve prompting the language model 545 to generate a new/modified model output. In such examples, additional prompt data may be determined, which may include the original prompt data, the initial model output, and an indication that the initial model output is not appropriate for output to the user 505. The additional prompt data may include a request or directive to the language model 545 to generate model output that is appropriate for output to the user 505. Another example remedial action may involve the system outputting a generic/template response (e.g., "Sorry, I can't help you with that" or "I cannot answer questions for [inappropriate category])") or a request for a rephrased input (e.g., "can you rephrase that").

In some embodiments, the compliance component 570 may cause the system to output a response indicating where (e.g., a source external to the system components 520) the included/outputted information may be found. For example, the response may include an indication of a source of the training data or the data (e.g., API response 662) that the response is based on (e.g., the indication may include a description of an owner of the intellectual property rights corresponding to the training data/the response information, a hyperlink to the source, etc.). In some embodiments the compliance component 570 may determine that the model generated response is based on (e.g., summarizing, using, similar to, etc.) data that protected by intellectual property rights (or other laws), and instead of outputting the language model generated response (e.g., LM response 646). In some embodiments the responsive output data 562 may include an indication of the intellectual property rights owner, may include access to a source of the data (e.g., website link), or may include a template response (e.g., "I cannot process this request" or "The requested data is protected by intellectual property rights", etc.). In some embodiments, the compliance component 570 may determine that the user input data 527 involves processing data or outputting data that is protected by certain intellectual property rights (or other laws). An example of such a user input may be "write a story about [protected character]" or "draw an image of [protected character] doing [some action]", where the owner of intellectual property rights in the [protected character] may not allow use, copying, or other operations. In response, the system may cease or prevent processing by the language model orchestrator component 530 of the user input data 527, and the system may output a template response (e.g., "I cannot process this request" or "The requested data is protected by intellectual property rights", etc.).

As shown in FIG. 5, the system component(s) 520 may include a personalized context component 565. In some embodiments, the personalized context component 565 may be included in the language model orchestrator component 530. In other embodiments, the personalized context component 565 may be one of the responding components 560 and the action plan generation component 550 may cause the action plan execution component 525 to send an API request to the personalized context component 565.

The personalized context component 565 may be configured to determine personalized context data including context data corresponding to the user input data 527 and/or the user 505. In some embodiments, the initial plan generation component 535 may request personalized context data to include in the prompt 642. In other embodiments, other system component(s) 520, such as the language model 545, may request personalized context data (e.g., to determine a personalized response to a user input). The personalized context data may include user preferences, past user inputs, past system outputs for past user inputs from the user 505, past skill/app usage, user-defined items, etc. The personalized context component 565 may infer user preferences from user-provided preferences, past user interactions by the user 505, information related to users similar to the user 505, etc. In some embodiments, the personalized context component 565 may employ one or more techniques to determine the personalized context data; such techniques may include using a rules-engine, using one or more machine learning models (including a generative model), topic determination techniques, neural retrieval search techniques, etc.

In examples, the personalized context component 565 may receive the user input data 527, task data representing a current task being performed/processed, and/or model output indicating that an ambiguity exists or additional information is needed to generate a response to the user input. The personalized context component 565 may receive a query in some examples, which may include an identifier for the user 505. In a non-limiting example, the personalized context component 565 may receive the following example requests: "Does the user prefer to use [Music Service 1] or [Music Service 2] for playing music," or "What kind of music does the user like?" The personalized context component 565 determine example personalized context data including "The user prefers [Music Service 1]" or "The user likes [music genre]").

Figure 7:
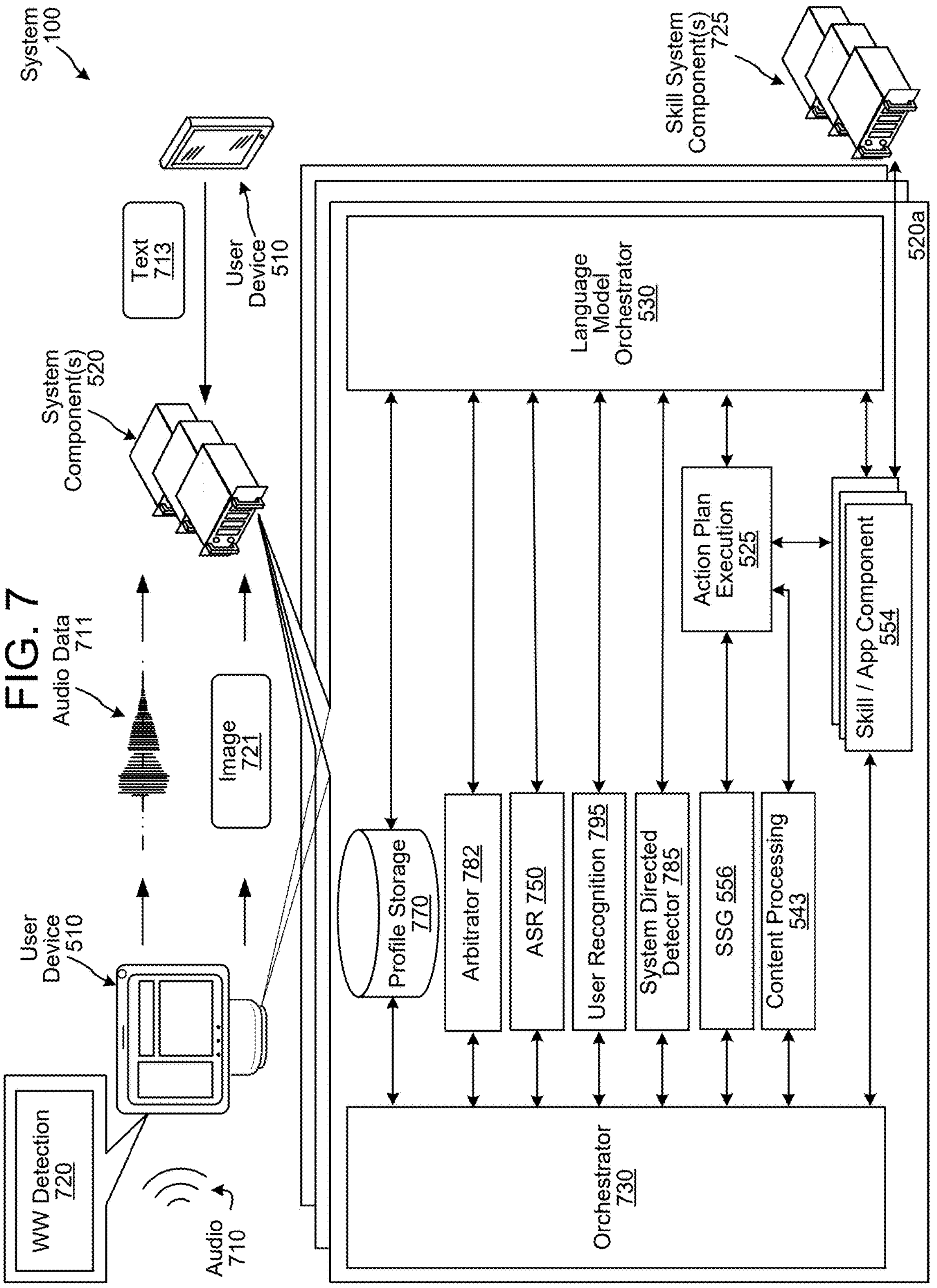
FIG. 7 is a conceptual diagram illustrating example components of the system, according to embodiments of the present disclosure.

Further information related to the SSG component 556 and the skill/app component 554 is described herein in relation to FIG. 7.

In some embodiments, the language model 545 may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks. Some techniques may involve supervised fine-tuning (SFT), unsupervised fine-tuning, semi-supervised fine-tuning, or other types of learning.

In some embodiments, one or more of the system components 520 described herein may be configured to begin processing with respect to data as soon as the data or a portion of the data is available to the components (e.g., processing in a streaming fashion). Some system components may be generative components/models that can begin processing with respect to portions of data as they are available, instead of waiting to initiate processing after the entirety of data is available. For example, the language model 545 may start processing a first portion of the prompt 642 while the prompt generation component 540 determines a second/subsequent portion of the prompt 642. As another example, the action plan generation component 550 may start processing a first portion of the LM response 646 while the language model 545 is generating a second/subsequent portion of the LM response 646.

The system 100 may operate using various components as described in FIG. 7. The various components may be located on same or different physical devices. Communication between various components may occur directly or across a network(s) 599. The user device 510 may include audio capture component(s), such as a microphone or array of microphones of a user device 510, captures audio 710 and creates corresponding audio data. Once speech is detected in audio data representing the audio 710, the user device 510 may determine if the speech is directed at the user device 510/system component(s). In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of user device 510. Other input forms may include indication that the user has pressed a physical or virtual button on user device 510, the user has made a gesture, etc. The user device 510 may also capture images using camera(s) of the user device 510 and may send image data 721 representing those image(s) to the system component(s). The image data 721 may include raw image data or image data processed by the user device 510 before sending to the system component(s). The image data 721 may be used in various manners by different components of the system to perform operations such as determining whether a user is directing an utterance to the system, interpreting a user command, responding to a user command, etc. In some embodiments, the user input data 527 (described in relation to FIG. 5) may include one or more the audio 710, the audio data 711, the text data 713 and the image data 721.

The wakeword detection component 720 of the user device 510 may process the audio data, representing the audio 710, to determine whether speech is represented therein. The user device 510 may use various techniques to determine whether the audio data includes speech. In some examples, the user device 510 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 510 may implement a classifier configured to distinguish speech from background noise. The classifier may be implemented by techniques such as linear classifiers, support vector machines, and decision trees. In still other examples, the user device 510 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 710, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using an RNN. Follow-on posterior threshold tuning or smoothing is applied for decision making. Other techniques for wakeword detection, such as those known in the art, may also be used.

Once the wakeword is detected by the wakeword detection component 720 and/or input is detected by an input detector, the user device 510 may "wake" and begin transmitting audio data 711, representing the audio 710, to the system component(s) 520. The audio data 711 may include data corresponding to the wakeword; in other embodiments, the portion of the audio corresponding to the wakeword is removed by the user device 510 prior to sending the audio data 711 to the system component(s) 520. In the case of touch input detection or gesture-based input detection, the audio data may not include a wakeword.

In some implementations, the system 100 may include more than one system component(s). The system component(s) 520 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 720 may result in sending audio data to system component(s) 520*a* for processing while detection of the wakeword "Computer" by the wakeword detector may result in sending audio data to system component(s) 520*b* for processing. The system may have a separate wakeword and system for different skills/systems (e.g., "Castle Adventure" for a game play skill/system component(s) 520*c*) and/or such skills/systems may be coordinated by one or more skill component(s) 554 of one or more system component(s) 520.

The user device 510/system component(s) 520 may also include a system directed input detector 785. The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 720. If the system directed input detector 785 determines an input is directed to the system, the user device 510 may "wake" and begin sending captured data for further processing. If data is being processed the user device 510 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 510 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input and may output a green indicator if a system directed input is detected. Other such configurations are possible.

Upon receipt by the system component(s) 520, the audio data 711 may be sent to an orchestrator component 730 and/or the language model orchestrator component 530. The orchestrator component 730 may include memory and logic that enables the orchestrator component 730 to transmit various pieces and forms of data to various components of the system, as well as perform other operations as described herein. In some embodiments, the orchestrator component 730 may optionally be included in the system component(s) 520. In embodiments where the orchestrator component 730 is not included in the system component(s) 520, the audio data 711 may be sent directly to the language model orchestrator component 530. Further, in such embodiments, each of the components of the system component(s) 520 may be configured to interact with the language model orchestrator component 530, the action plan execution component 525, the API provider component, and/or other component(s).

In some embodiments, the system component(s) 520 may include an arbitrator component 782, which may be configured to determine whether the orchestrator component 730 and/or the language model orchestrator component 530 are to process with respect to user input data. In some embodiments, the language model orchestrator component 530 may be selected to process with respect to the audio data 711 only if the user 505 associated with the audio data 711 (or the user device 510 that captured the audio 710) has previously indicated that the language model orchestrator component 530 may be selected to process with respect to user inputs received from the user 505.

In some embodiments, the arbitrator component 782 may determine the orchestrator component 730 and/or the language model orchestrator component 530 are to process with respect to the audio data 711 based on metadata associated with the audio data 711. For example, the arbitrator component 782 may be a classifier configured to process a natural language representation of the audio data 711 (e.g., output by the ASR component 750) and classify the corresponding user input as to be processed by the orchestrator component 730 and/or the language model orchestrator component 530. For further example, the arbitrator component 782 may determine whether the device from which the audio data 711 is received is associated with an indicator representing the audio data 711 is to be processed by the orchestrator component 730 and/or the language model orchestrator component 530. As an even further example, the arbitrator component 782 may determine whether the user (e.g., determined using data output from the user recognition component 795) from which the audio data 711 is received is associated with a user profile including an indicator representing the audio data 711 is to be processed by the orchestrator component 730 and/or the language model orchestrator component 530. As another example, the arbitrator component 782 may determine whether the audio data 711 (or the output of the ASR component 750) corresponds to a request representing that the audio data 711 is to be processed by the orchestrator component 730 and/or the language model orchestrator component 530 (e.g., a request including "let's chat" may represent that the audio data 711 is to be processed by the language model orchestrator component 530).

In some embodiments, if the arbitrator component 782 is unsure (e.g., a confidence score corresponding to whether the orchestrator component 730 and/or the language model orchestrator component 530 is to process is below a threshold), then the arbitrator component 782 may send the audio data 711 to both of the orchestrator component 730 and the language model orchestrator component 530. In such embodiments, the orchestrator component 730 and/or the language model orchestrator component 530 may include further logic for determining further confidence scores during processing representing whether the orchestrator component 730 and/or the language model orchestrator component 530 should continue processing, as is discussed further herein below.

The arbitrator component 782 may send the audio data 711 to an ASR component 750. In some embodiments, the component selected to process the audio data 711 (e.g., the orchestrator component 730 and/or the language model orchestrator component 530) may send the audio data 711 to the ASR component 750. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to the arbitrator component 782, the orchestrator component 730, and/or the language model orchestrator component 530. In instances where the text data is sent to the arbitrator component 782, the arbitrator component 782 may send the text data to the component selected to process the audio data 711 (e.g., the orchestrator component 730 and/or the language model orchestrator component 530). The text data sent from the ASR component 750 to the arbitrator component 782, the orchestrator component 730, and/or the language model orchestrator component 530 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 730 may cause a NLU component (not shown) to perform processing with respect to the ASR data generated by the ASR component 750. The NLU component may attempt to make a semantic interpretation of the phrase(s) or statement (s) represented in the ASR data input therein by determining one or more meanings associated with the phrase(s) or statement(s) represented in the text data. The NLU component may determine an intent representing an action that a user desires be performed and may determine information that allows a device (e.g., the device 510, the system component(s) 520, a skill/app component 554, a skill system component(s) 725, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 510. In another example, if the ASR data corresponds to "turn off the lights," the NLU component may determine an intent that the system turn off lights associated with the device 510 or the user 505. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 730. The orchestrator component 730 may forward the NLU results data to a skill component(s) 554. If the NLU results data includes a single NLU hypothesis, the NLU component and the orchestrator component 730 may direct the NLU results data to the skill component(s) 554 associated with the NLU hypothesis. If the NLU results data includes an N-best list of NLU hypotheses, the NLU component and the orchestrator component 730 may direct the top scoring NLU hypothesis to a skill component(s) 554 associated with the top scoring NLU hypothesis. The system may also include a post-NLU ranker which may incorporate other information to rank potential interpretations determined by the NLU component.

In some embodiments, after determining that the orchestrator component 730 and/or the language model orchestrator component 530 should process with respect to the user input, the arbitrator component 782 may be configured to periodically determine whether the orchestrator component 730 and/or the language model orchestrator component 530 should continue processing with respect to the user input. For example, after a particular point in the processing of the orchestrator component 730 (e.g., after performing NLU, prior to determining a skill component 554 to process with respect to the user input, prior to performing an action responsive to the user input, etc.) and/or the language model orchestrator component 530 (e.g., after selecting a task to be completed, after receiving the action response data from the one or more components, after completing a task, prior to performing an action responsive to the user input, etc.) the orchestrator component 730 and/or the language model orchestrator component 530 may query the arbitrator component 782 has determined that the orchestrator component 730 and/or the language model orchestrator component 530 should halt processing with respect to the user input. As discussed above, the system 100 may be configured to stream portions of data associated with processing with respect to a user input to the one or more components such that the one or more components may begin performing their configured processing with respect to that data as soon as it is available to the one or more components. As such, the arbitrator component 782 may cause the orchestrator component 730 and/or the language model orchestrator component 530 to begin processing with respect to a user input as soon as a portion of data associated with the user input is available (e.g., the ASR data, context data, output of the user recognition component 795. Thereafter, once the arbitrator component 782 has enough data to perform the processing described herein above to determine whether the orchestrator component 730 and/or the language model orchestrator component 530 is to process with respect to the user input, the arbitrator component 782 may inform the corresponding component (e.g., the orchestrator component 730 and/or the language model orchestrator component 530) to continue/halt processing with respect to the user input at one of the logical checkpoints in the processing of the orchestrator component 730 and/or the language model orchestrator component 530.

A skill system component(s) 725 may communicate with a skill/app component(s) 554 within the system component(s) 520 directly with the orchestrator component 730 and/or the action plan execution component 525, or with other components. A skill system component(s) 725 may be configured to perform one or more actions. An ability to perform such action(s) may sometimes be referred to as a "skill." That is, a skill may enable a skill system component(s) 725 to execute specific functionality in order to provide data or perform some other action requested by a user. For example, a weather service skill may enable a skill system component(s) 725 to provide weather information to the system component(s) 520, a car service skill may enable a skill system component(s) 725 to book a trip with respect to a taxi or ride sharing service, an order pizza skill may enable a skill system component(s) 725 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 520 may be configured with a skill/app component 554 dedicated to interacting with the skill system component(s) 725. Unless expressly stated otherwise, reference to a skill, skill device, or skill component may include a skill/app component 554 operated by the system component(s) 520 and/or skill/app operated by the skill system component(s) 725. Moreover, the functionality described herein as a skill or skill may be referred to using many different terms, such as an action, bot, app, or the like. The skill component 554 and or skill system component(s) 725 may return output data to the orchestrator component 730.

The system component(s) includes a SSG component 556. The SSG component 556 may generate audio data (e.g., synthesized speech) from text data, text embeddings, text tokens, audio tokens, audio embeddings, etc., using one or more different methods. Data input to the SSG component 556 may come from a skill/app component 554, the orchestrator component 730, the action plan execution component 525, or another component of the system. In one method of synthesis called unit selection, the SSG component 556 matches data against a database of recorded speech. The SSG component 556 selects matching units of recorded speech and concatenates the units together to form audio data. In another method of synthesis called parametric synthesis, the SSG component 556 varies parameters such as frequency, volume, and noise to create audio data including an artificial speech waveform. Parametric synthesis uses a computerized voice generator, sometimes called a vocoder.

The user device 510 may include still image and/or video capture components such as a camera or cameras to capture one or more images. The user device 510 may include circuitry for digitizing the images and/or video for transmission to the system component(s) 520 as image data. The user device 510 may further include circuitry for voice command-based control of the camera, allowing a user 505 to request capture of image or video data. The user device 510 may process the commands locally or send audio data 711 representing the commands to the system component(s) 520 for processing, after which the system component(s) 520 may return output data that can cause the user device 510 to engage its camera.

The system component(s) 520/the user device 510 may include a user recognition component 795 that recognizes one or more users using a variety of data. However, the disclosure is not limited thereto, and the user device 510 may include the user recognition component 795 instead of and/or in addition to the system component(s) 520 without departing from the disclosure.

The user recognition component 795 may take as input the audio data 711 and/or text data output by the ASR component 750. The user recognition component 795 may perform user recognition by comparing audio characteristics in the audio data 711 to stored audio characteristics of users. The user recognition component 795 may also perform user recognition by comparing biometric data (e.g., fingerprint data, iris data, etc.), received by the system in correlation with the present user input, to stored biometric data of users assuming user permission and previous authorization. The user recognition component 795 may further perform user recognition by comparing image data (e.g., including a representation of at least a feature of a user), received by the system in correlation with the present user input, with stored image data including representations of features of different users. The user recognition component 795 may perform additional user recognition processes, including those known in the art.

The user recognition component 795 determines scores indicating whether user input originated from a particular user. For example, a first score may indicate a likelihood that the user input originated from a first user, a second score may indicate a likelihood that the user input originated from a second user, etc. The user recognition component 795 also determines an overall confidence regarding the accuracy of user recognition operations.

Output of the user recognition component 795 may include a single user identifier corresponding to the most likely user that originated the user input. Alternatively, output of the user recognition component 795 may include an N-best list of user identifiers with respective scores indicating likelihoods of respective users originating the user input. The output of the user recognition component 795 may be used to inform processing of the arbitrator component 782, the orchestrator component 730, and/or the language model orchestrator component 530 as well as processing performed by other components of the system.

The system component(s) 520/user device 510 may include a presence detection component that determines the presence and/or location of one or more users using a variety of data.

The system 100 (either on user device 510, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 510, the user profile (associated with the presented login information) may be updated to include information about the user device 510, for example with an indication that the device is currently in use. Each user profile may include identifiers of components (e.g., responding component(s) 560 such as skills/apps, language model-based agents, knowledge bases, components for a particular domain, etc.) that the user has enabled. When a user enables a component, the user is providing the system component(s) with permission to allow the component to execute with respect to the user's inputs. If a user does not enable a component, the system component(s) may not invoke that component to execute with respect to the user's inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 7 may be illustrated as part of system component(s) 520, user device 510, or otherwise, the components may be arranged in other device(s) (such as in user device 510 if illustrated in system component(s) 520 or vice-versa, or in other device(s) altogether) without departing from the disclosure.

In at least some embodiments, the system component(s) 520 may receive the audio data 711 from the user device 510, to recognize speech corresponding to a spoken input in the received audio data 711, and to perform functions in response to the recognized speech. In at least some embodiments, these functions involve sending directives (e.g., commands), from the system component(s) to the user device 510 (and/or other user devices 510) to cause the user device 510 to perform an action, such as output an audible response to the spoken input via a loudspeaker(s), and/or control secondary devices in the environment by sending a control command to the secondary devices.

Thus, when the user device 510 is able to communicate with the system component(s) over the network(s) 599, some or all of the functions capable of being performed by the system component(s) may be performed by sending one or more directives over the network(s) 599 to the user device 510, which, in turn, may process the directive(s) and perform one or more corresponding actions. For example, the system component(s), using a remote directive that is included in response data (e.g., a remote response), may direct the user device 510 to output an audible response (e.g., using SSG processing performed by an on-device SSG component) to a user's question via a loudspeaker(s) of (or otherwise associated with) the user device 510, to output content (e.g., music) via the loudspeaker(s) of (or otherwise associated with) the user device 510, to display content on a display of (or otherwise associated with) the user device 510, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 505 as part of a shopping function, establishing a communication session (e.g., a video call) between the user 505 and another user, and so on.

In at least some embodiments, the user device 510, may send the audio data 711 to the wakeword detection component 720. If the wakeword detection component 720 detects a wakeword in the audio data 711, the wakeword detection component 720 may send an indication of such detection to the user device 510. In response to receiving the indication, the audio data 711 may be sent to the system component(s) 520 and/or the ASR component of the user device 510. The wakeword detection component 720 may also send an indication, to the user device 510, representing a wakeword was not detected. In response to receiving such an indication, the audio data 711 may not be sent to the system component(s) 520, and the user device 510 may prevent the ASR component of the user device 510 from further processing the audio data 711. In this situation, the audio data 711 can be discarded.

In some embodiments, the user device 510 may include some or all of the components illustrated in FIG. 7 and/or discussed herein above with respect to the system component(s) 520. In other embodiments, the components illustrated in FIG. 7 and/or discussed herein with respect to the system component(s) 520 may be distributed across the user device 510 and the system component(s) 520.

In at least some embodiments, the components of the user device 510 (e.g., on-device components) may not have the same capabilities as the components of the system component(s) 520. For example, on-device components may be configured to generate a response to only a subset of the natural language user inputs that may be handled by the system component(s) 520. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 510 attempts to process a natural language user input for which the on-device components are not necessarily best suited, the language processing results determined by the user device 510 may indicate a low confidence or other metric indicating that the processing by the user device 510 may not be as accurate as the processing done by the system component(s) 520.

In some embodiments, the system component(s) 520 and the user device 510 may process as described herein to generate responses to the user input corresponding to the audio data 711. The system component(s) 520 may send the response to the user device 510 and the user device 510 may determine whether to output the response generated by the system component(s) 520 or the response generated by the user device 510. In some embodiments, the system component(s) 520 may be configured to perform a portion of the processing described herein, such as a portion of processing not performable by the user device 510 and send the result of such processing to the user device 510. The user device 510 may be configured to determine whether to use the result to complete processing to generate the response to the user device 510.

In at least some embodiments, the user device 510 may include, or be configured to use, one or more skill/app components that may operate similarly to the skill/app component(s) 554. The skill/app component(s) on the user device 510 may correspond to one or more domains that are used in order to determine how to act on a spoken input in a particular way, such as by outputting a directive that corresponds to the determined intent, and which can be processed to implement the desired operation. The skill component(s) installed on the user device 510 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 510 may be in communication with one or more skill system component(s) 725. For example, a skill system component(s) 725 may be located in a remote environment (e.g., separate location) such that the user device 510 may only communicate with the skill system component(s) 725 via the network(s) 599. However, the disclosure is not limited thereto. For example, in at least some embodiments, a skill system component(s) 725 may be configured in a local environment (e.g., home server and/or the like) such that the user device 510 may communicate with the skill system component(s) 725 via a private network, such as a local area network (LAN).

Figure 8:
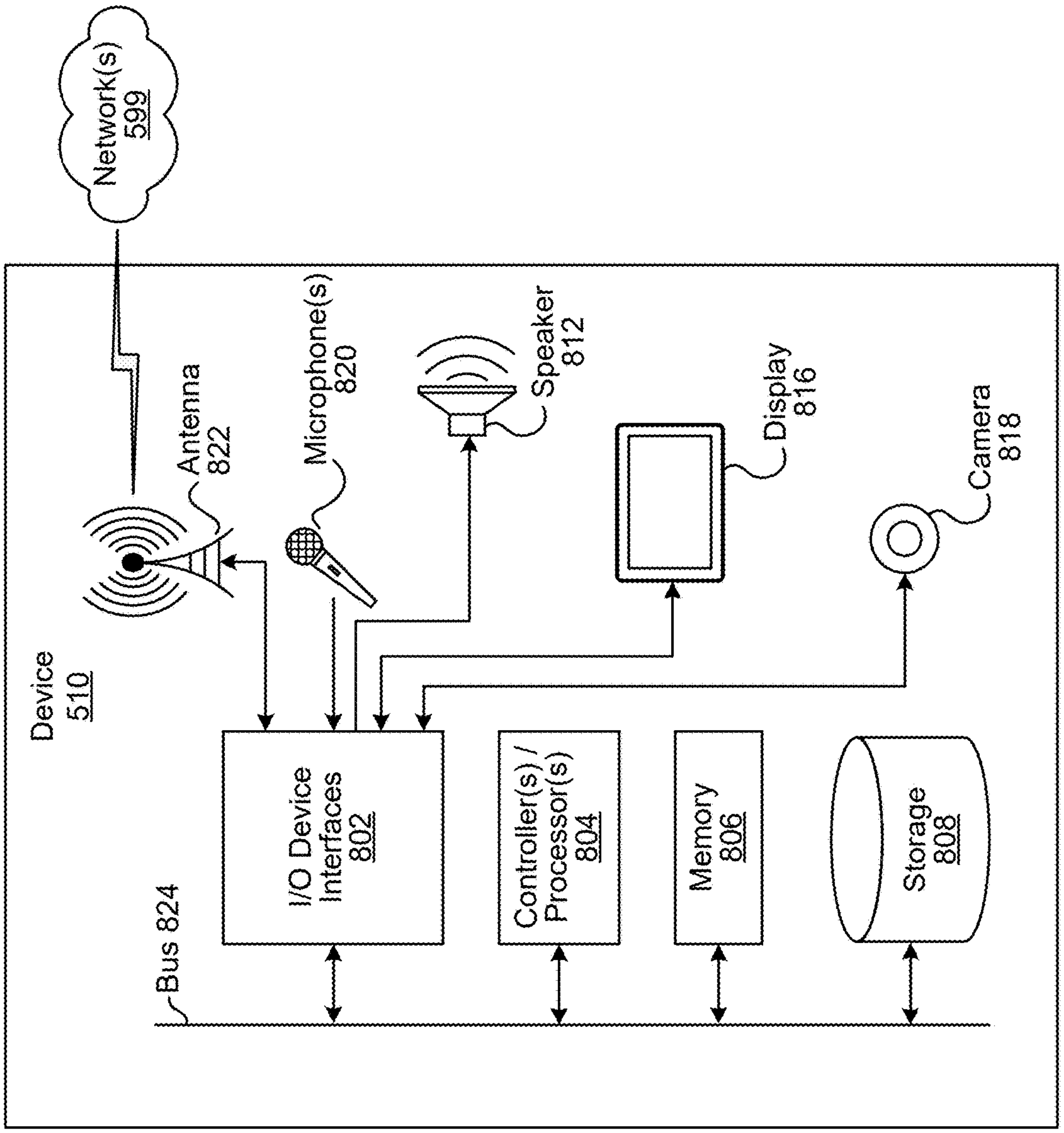
FIG. 8 is a block diagram conceptually illustrating example components of a device, according to embodiments of the present disclosure.
Figure 9:
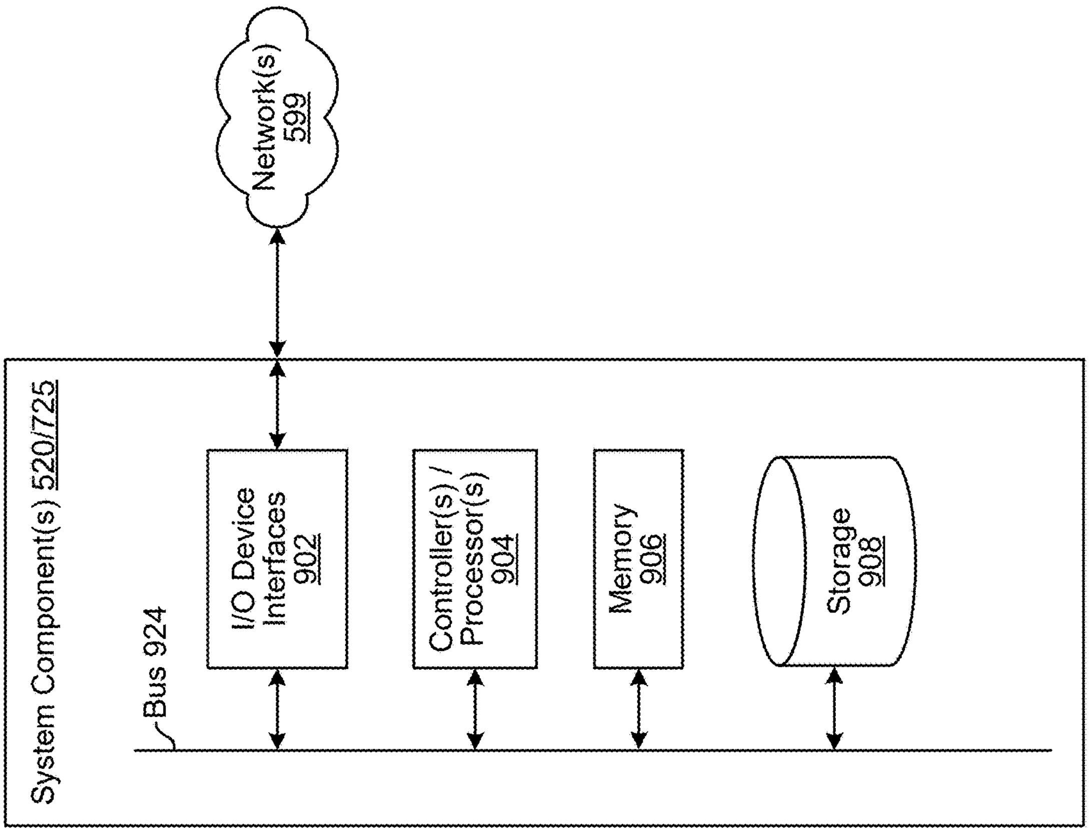
FIG. 9 is a block diagram conceptually illustrating example components of a system, according to embodiments of the present disclosure.

FIG. 8 is a block diagram conceptually illustrating a user device 510 that may be used with the system. FIG. 9 is a block diagram conceptually illustrating example components of a remote device, such as the system component(s) 520, which may assist with ASR processing, NLU processing, language model processing, etc., and a skill system component(s) 725. System component(s) (520/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 510 may operate locally to a user (e.g., within a same environment so the device may receive inputs and playback outputs for the user) the server/system component(s) may be located remotely from the user device 510 as its operations may not require proximity to the user. The server/system component(s) may be located in an entirely different location from the user device 510 (for example, as part of a cloud computing system or the like) or may be located in a same environment as the user device 510 but physically separated therefrom (for example a home server or similar device that resides in a user's home or business but perhaps in a closet, basement, attic, or the like). The system component(s) 520 may also be a version of a user device 510 that includes different (e.g., more) processing capabilities than other user device(s) 510 in a home/office. One benefit to the server/system component(s) being in a user's home/business is that data used to process a command/return a response may be kept within the user's home, thus reducing potential privacy concerns.

Multiple system components (520/725) may be included in the overall system 100 of the present disclosure, such as one or more natural language processing system component(s) 520 for performing ASR processing, one or more natural language processing system component(s) 520 for performing NLU processing, one or more skill system component(s) 725, etc. In operation, each of these systems may include computer-readable and computer-executable instructions that reside on the respective device (520/725), as will be discussed further below.

Each of these devices (510/520/725) may include one or more controllers/processors (804/904), which may each include a central processing unit (CPU) for processing data and computer-readable instructions, and a memory (806/906) for storing data and instructions of the respective device. The memories (806/906) may individually include volatile random-access memory (RAM), non-volatile read only memory (ROM), non-volatile magnetoresistive memory (MRAM), and/or other types of memory. Each device (510/520/725) may also include a data storage component (808/908) for storing data and controller/processor-executable instructions. Each data storage component (808/

908) may individually include one or more non-volatile storage types such as magnetic storage, optical storage, solid-state storage, etc. Each device (510/520/725) may also be connected to removable or external non-volatile memory and/or storage (such as a removable memory card, memory key drive, networked storage, etc.) through respective input/output device interfaces (802/902).

Computer instructions for operating each device (510/520/725) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (510/520/725) includes input/output device interfaces (802/902). A variety of components may be connected through the input/output device interfaces (802/902), as will be discussed further below. Additionally, each device (510/520/725) may include an address/data bus (824/924) for conveying data among components of the respective device. Each component within a device (510/520/725) may also be directly connected to other components in addition to (or instead of) being connected to other components across the bus (824/924).

Referring to FIG. 8, the user device 510 may include input/output device interfaces 802 that connect to a variety of components such as an audio output component such as a speaker 812, a wired headset or a wireless headset (not illustrated), or other component capable of outputting audio. The user device 510 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 510 may additionally include a display 816 for displaying content. The user device 510 may further include a camera 818.

Via antenna(s) 822, the input/output device interfaces 802 may connect to one or more networks 599 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 599, the system may be distributed across a networked environment. The I/O device interface (802/902) may also include communication components that allow data to be exchanged between devices such as different physical servers in a collection of servers or other components.

The components of the user device(s) 510, the system component(s) 520, or a skill system component(s) 725 may include their own dedicated processors, memory, and/or storage. Alternatively, one or more of the components of the user device(s) 510, the system component(s) 520, or a skill system component(s) 725 may utilize the I/O interfaces (802/902), processor(s) (804/904), memory (806/906), and/or storage (808/908) of the user device(s) 510, the system component(s) 520, or the skill system component(s) 725, respectively. Thus, the ASR component 750 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 510, the system component(s) 520, and a skill system component(s) 725, as described herein, are illustrative, and may be located as a stand-alone device or may be included, in whole or in part, as a component of a larger device or system. As can be appreciated, a number of components may exist either as a system component(s) and/or on user device 510. Unless expressly noted otherwise, the system version of such components may operate similarly to the user device version of such components and thus the description of one version (e.g., the system version or the local user device version) applies to the description of the other version (e.g., the local user device version or system version) and vice-versa.

Figure 10:
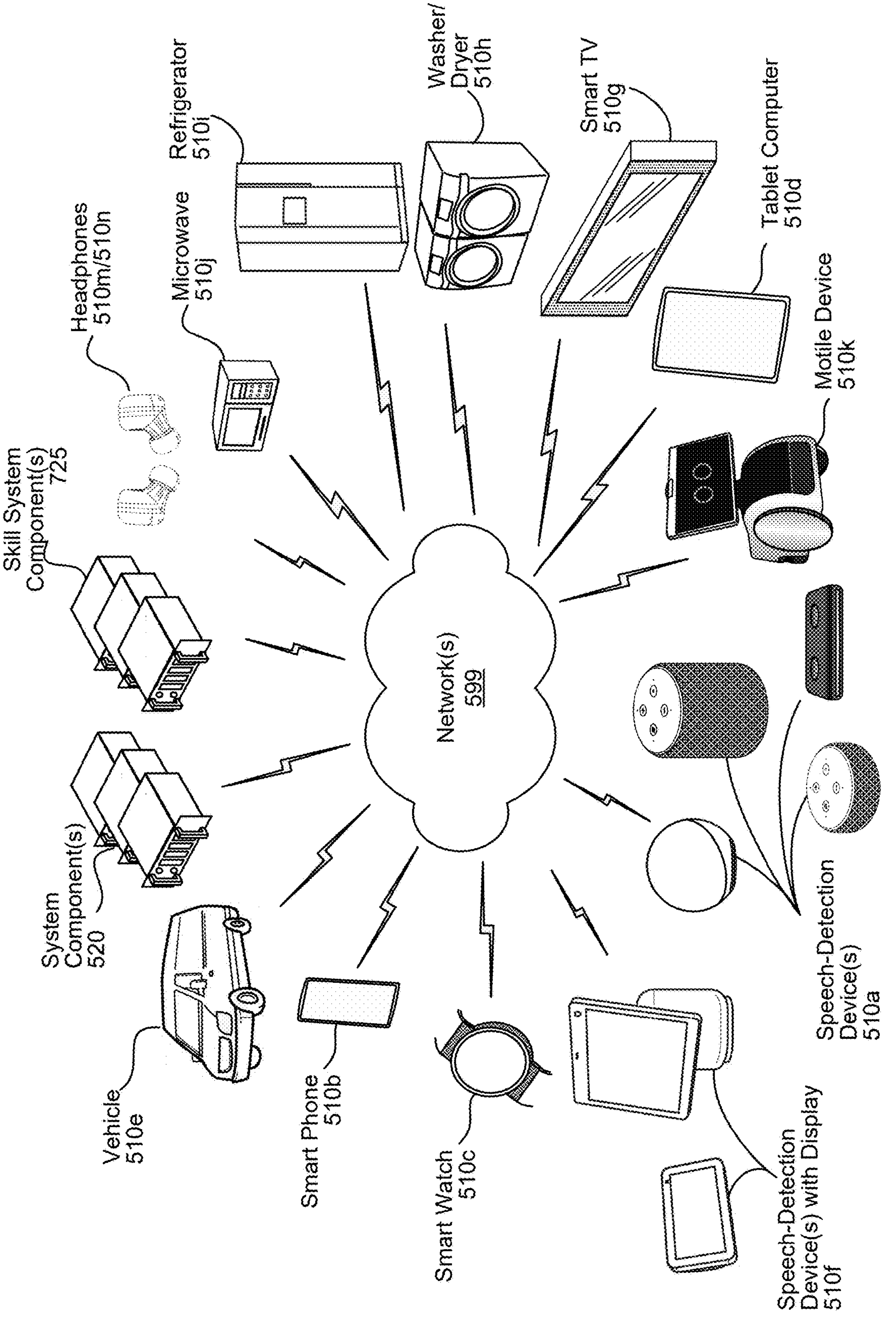
FIG. 10 illustrates an example of a network for use with the overall system, according to embodiments of the present disclosure.

As illustrated in FIG. 10, multiple devices (510*a*-510*n*, 520, 725) may contain components of the system and the devices may be connected over a network(s) 599. The network(s) 599 may include a local or private network or may include a wide network such as the Internet. Devices may be connected to the network(s) 599 through either wired or wireless connections. For example, a speech-detection user device 510*a*, a smart phone 510*b*, a smart watch 510*c*, a tablet computer 510*d*, a vehicle 510*e*, a speech-detection device with display 510*f*, a display/smart television 510*g*, a washer/dryer 510*h*, a refrigerator 510*i*, a microwave 510*j*, autonomously motile user device 510*k* (e.g., a robot), headphones 510*m*/510*n* (e.g., wireless earbuds, wireless headphones), etc., may be connected to the network(s) 599 through a wireless service provider, over a Wi-Fi or cellular network connection, or the like. Other devices are included as network-connected support devices, such as the system component(s) 520, the skill system component(s) 725, and/or others. The support devices may connect to the network(s) 599 through a wired connection or wireless connection. Networked devices may capture audio using one-or-more built-in or connected microphones or other audio capture devices, with processing performed by components of the same device or another device connected via the network(s) 599, such as the system component(s) 520.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Further, the phrase "based on" is intended to mean "based at least in part on" unless specifically stated otherwise.

What is claimed is:

1. A computer-implemented method comprising:

receiving input data corresponding to a user input requesting content;

processing the input data to determine a first content candidate corresponding to a first point of interest (POI) potentially relevant to the user input;

processing the first content candidate to determine a first numerical feature representing a distance between a user location and a location associated with the first POI;

determining first data including a semantic representation of the first numerical feature;

processing the first content candidate to determine a first semantic feature representing a name associated with the first POI;

processing, using a language model, the input data, the first data, and the first semantic feature to generate a first semantic relevance value corresponding to the first content candidate;

processing, using a first machine learning (ML) model, the first numerical feature to generate a first numerical relevance value corresponding to the first content candidate;

based on the first semantic relevance value and the first numerical relevance value, determining a first relevance metric corresponding to a relevance of the first content candidate to the user input;

determining a second relevance metric corresponding to a relevance of a second content candidate, the second content candidate corresponding to a second POI potentially relevant to the user input;

based on the first relevance metric and the second relevance metric, generating output data responsive to the user input, the output data corresponding to the first POI; and causing presentation of the output data.

2. The computer-implemented method of claim 1, further comprising:

processing, using a first component, the input data to determine the first content candidate, wherein the first content candidate is determined based on the first content candidate being semantically similar to the user input;

determining the input data is associated with a first attribute type; and based on determining the input data is associated with the first attribute type, processing, using a second component, the input data to determine the second content candidate, wherein the second content candidate is determined based on the second content candidate being associated with the first attribute type.

3. The computer-implemented method of claim 1, further comprising:

processing, using a first component, the first content candidate to determine the first numerical feature associated with the first POI;

processing, using a second component, the first content candidate to determine a third numerical feature associated with the first POI, the first numerical feature corresponding to a rating associated with the first POI;

processing, using a third component, the first numerical feature to generate the first data, the first semantic feature corresponding to a semantic representation of the distance;

processing, using a fourth component, the third numerical feature to generate a fourth semantic feature corresponding to the third numerical feature, the fourth semantic feature corresponding to a semantic representation of the rating; and processing, using a fifth component, the first content candidate to determine a third semantic feature associated with the first POI, the third semantic feature corresponding to a category associated with the first POI.

4. The computer-implemented method of claim 1, further comprising:

generating third data including the input data, the first semantic feature, and the first data;

processing the third data to generate a first tokenized representation of the third data; and processing, using the language model, the first tokenized representation to generate the first semantic relevance value corresponding to the first content candidate, wherein the processing associated with the first content candidate and processing associated with the second content candidate is performed at least partially in parallel.

5. A computer-implemented method comprising:

receiving an input requesting content;

processing the input to determine first content relevant to the input;

processing the first content to determine a first numerical feature;

processing the first numerical feature to generate a first semantic feature corresponding to the first numerical feature;

processing the first content to determine a second semantic feature;

processing, using a first model, the input, the first semantic feature, and the second semantic feature to generate a first value;

processing, using a second model, the first numerical feature to generate a second value;

based on the first value and the second value, determining a first metric corresponding to a relevance of the first content to the input;

based on at least the first metric, generating, using the first content, an output; and causing presentation of the output in response to the input.

6. The computer-implemented method of claim 5, further comprising:

processing the input to determine second content potentially relevant to the input;

processing the second content to determine a second numerical feature;

processing the second numerical feature to generate a third semantic feature corresponding to the second numerical feature;

processing the second content to determine a fourth semantic feature;

processing, using the first model, the input, the third semantic feature, and the fourth semantic feature to generate a third value;

processing, using the second model, the second numerical feature to generate a fourth value;

based on the third value and the fourth value, determining a second metric corresponding to a relevance of the second content to the input; and based on the first metric and the second metric, generating the output using the first content, instead of the second content, wherein the processing associated with the first content and the processing associated with the second content is performed at least partially in parallel.

7. The computer-implemented method of claim 5, further comprising:
processing, using a first component, the first content to determine the first numerical feature, the first numerical feature corresponding to a first type of numerical feature associated with the first content;
processing, using a second component, the first numerical feature to generate the first semantic feature, the first semantic feature corresponding to a semantic representation of the first numerical feature; and
processing, using a third component, the first content to determine the second semantic feature associated with the first content, the second semantic feature corresponding to a first type of semantic feature associated with the first content.

8. The computer-implemented method of claim 5, further comprising:
generating a first representation corresponding to the input, the first semantic feature, and the second semantic feature, the first representation including a first portion including first natural language and the first semantic feature and a second portion including second natural language and the second semantic feature.

9. The computer-implemented method of claim 5, further comprising:
generating a first representation corresponding to the input, the first semantic feature, and the second semantic feature;
processing the first representation to generate a tokenized representation of the first representation; and
processing, using the first model, the tokenized representation to generate the first value.

10. The computer-implemented method of claim 5, further comprising:
processing, using a first component, the input to determine the first content, wherein the first content is determined based on the first content being semantically similar to the input;
determining the input is associated with a first attribute type; and
based on determining the input is associated with a first attribute type, processing, using a second component, the input to determine second content, wherein the second content is determined based on the second content being associated with the first attribute type.

11. The computer-implemented method of claim 5, further comprising:
determining a first weight associated with semantic features;
determining a second weight corresponding to a first type of numerical features;
based on the first weight and the first value, determining a third value corresponding to a semantic relevance of the first content;
based on the second weight and the second value, determining a fourth value corresponding to a numerical relevance of the first content; and
based on the third value and the fourth value, determining the first metric.

12. The computer-implemented method of claim 5, further comprising:
processing the first content to determine an error associated with a first numerical feature type corresponding to a first numerical feature; and
based on determining the error, generating the first numerical feature, wherein the first numerical feature corresponds to a pre-generated value.

13. A computing system comprising:
at least one processor; and
at least one memory comprising instructions that, when executed by the at least one processor, cause the computing system to:
receive an input requesting content;
process the input to determine first content relevant to the input;
process the first content to determine a first numerical feature;
process the first numerical feature to generate a first semantic feature corresponding to the first numerical feature;
process the first content to determine a second semantic feature;
process, using a first model, the input, the first semantic feature, and the second semantic feature to generate a first value;
process, using a second model, the first numerical feature to generate a second value;
based on the first value and the second value, determine a first metric corresponding to a relevance of the first content to the input;
based on at least the first metric, generate, using the first content, an output; and
cause presentation of the output in response to the input.

14. The computing system of claim 13, wherein the at least one memory further comprises instructions that, when executed by the at least one processor, further cause the computing system to:
process the input to determine second content potentially relevant to the input;
process the second content to determine a second numerical feature;
process the second numerical feature to generate a third semantic feature corresponding to the second numerical feature;
process the second content to determine a fourth semantic feature;
process, using the first model, the input, the third semantic feature, and the fourth semantic feature to generate a third value;
process, using the second model, the second numerical feature to generate a fourth value;
based on the third value and the fourth value, determine a second metric corresponding to a relevance of the second content to the input; and
based on at least the first metric and the second metric, generate the output using the first content, instead of the second content, wherein the processing associated with the first content and processing associated with the second content is performed at least partially in parallel.

15. The computing system of claim 13, wherein the at least one memory further comprises instructions that, when executed by the at least one processor, further cause the computing system to:
process, using a first component, the first content to determine the first numerical feature, the first numerical feature corresponding to a first type of numerical feature associated with the first content;
process, using a second component, the first numerical feature to generate the first semantic feature, the first semantic feature corresponding to a semantic representation of the first numerical feature; and process, using a third component, the first content to determine the second semantic feature associated with the first content, the second semantic feature corresponding to a first type of semantic feature associated with the first content.

16. The computing system of claim 13, wherein the at least one memory further comprises instructions that, when executed by the at least one processor, further cause the computing system to:

generate a first representation corresponding to the input, the first semantic feature, and the second semantic feature, the first representation including a first portion including first natural language and the first semantic feature and a second portion including second natural language and the second semantic feature.

17. The computing system of claim 13, wherein the at least one memory further comprises instructions that, when executed by the at least one processor, further cause the computing system to:

generate a first representation corresponding to the input, the first semantic feature, and the second semantic feature;

process the first representation to generate a tokenized representation of the first representation; and process, using the first model, the tokenized representation to generate the first value.

18. The computing system of claim 13, wherein the at least one memory further comprises instructions that, when executed by the at least one processor, further cause the computing system to:

process, using a first component, the input to determine the first content, wherein the first content is determined based on the first content being semantically similar to the input;

determine the input is associated with a first attribute type; and based on determining the input is associated with a first attribute type, process, using a second component, the input to determine second content, wherein the second content is determined based on the second content being associated with the first attribute type.

19. The computing system of claim 13, wherein the at least one memory further comprises instructions that, when executed by the at least one processor, further cause the computing system to:

process the first content to determine an error associated with a first numerical feature type corresponding to a first numerical feature; and based on determining the error, generate the first numerical feature, wherein the first numerical feature corresponds to a pre-generated value.

20. The computing system of claim 13, wherein the at least one memory further comprises instructions that, when executed by the at least one processor, further cause the computing system to:

determine a first weight associated with semantic features;

determine a second weight corresponding to at least a first type of numerical features;

based on the first weight and the first value, determine a third value corresponding to a semantic relevance of the first content;

based on the second weight and the second value, determine a fourth value corresponding to a numerical relevance of the first content; and based on the third value and the fourth value, determine the first metric.

* * * * *